(12) United States Patent
Voigt et al.

(10) Patent No.: US 8,400,574 B2
(45) Date of Patent: Mar. 19, 2013

(54) SHORT WAVE INFRARED MULTI-CONJUGATE LIQUID CRYSTAL TUNABLE FILTER

(75) Inventors: Thomas Voigt, Export, PA (US); Lei Shi, Pittsburgh, PA (US); Zili Li, Barrington, IL (US); George Ventouris, Valley City, OH (US); Michael Fuhrman, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 99 days.

(21) Appl. No.: 13/066,428

(22) Filed: Apr. 14, 2011

(65) Prior Publication Data

US 2011/0279744 A1    Nov. 17, 2011

Related U.S. Application Data

(60) Provisional application No. 61/324,963, filed on Apr. 16, 2010, provisional application No. 61/403,141, filed on Sep. 10, 2010.

(51) Int. Cl.
　　*G02F 1/1335*　　(2006.01)
　　*G02F 1/03*　　(2006.01)
　　*G02F 1/07*　　(2006.01)
(52) U.S. Cl. ........... 349/18; 359/245; 359/246; 359/256
(58) Field of Classification Search .............. 349/18; 359/245, 246, 256
See application file for complete search history.

(56) References Cited

U.S. PATENT DOCUMENTS

| 3,647,279 | A | 3/1972 | Sharpless |
|---|---|---|---|
| 4,197,008 | A | 4/1980 | Pinnow |
| 4,394,069 | A | 7/1983 | Kaye |
| 4,848,877 | A | 7/1989 | Miller |
| 5,247,378 | A | 9/1993 | Miller |
| 5,387,920 | A | 2/1995 | Bos |
| 5,483,387 | A | 1/1996 | Bauhahn |
| 5,689,317 | A | 11/1997 | Miller |
| 5,892,612 | A | 4/1999 | Miller |
| 5,943,129 | A | 8/1999 | Hoyt |
| 5,953,083 | A | 9/1999 | Sharp |
| 5,953,087 | A | 9/1999 | Hoyt |
| 6,028,656 | A | 2/2000 | Buhrer |
| 6,172,722 | B1 | 1/2001 | Sharp |
| 6,310,673 | B1 | 10/2001 | Sharp |
| 6,373,568 | B1 | 4/2002 | Miller |

(Continued)

FOREIGN PATENT DOCUMENTS

WO　　WO0244800　　6/2002

OTHER PUBLICATIONS

Yariv, et al., "Optical Waves in Crystals," 1984, Chapter 5, John Wiley and Sons, New York.

(Continued)

*Primary Examiner* — Richard Kim
*Assistant Examiner* — David Chung

(57) ABSTRACT

A SWIR hyperspectral imaging filter has serial stages along an optical signal path with angularly distributed birefringent retarders and polarizers. The retarders can include active retarders such as tunable liquid crystal birefringent elements, passive retarders such as fixed retarders, and/or combinations thereof. Distinctly different periodic transmission spectra are provided by different filter stages, each having multiple retarders, in particular with some stages having broad bandpass peaks at wide spectral spacing and other stages have very narrow closely spaced peaks. The respective spectra include at least one tunably selectable band at which the transmission spectra of the filter stages coincide, whereby the salutary narrow bandpass and wide spectral spacing ranges of different stages apply together, resulting in a high finesse wavelength filter suitable for spectral imaging. The filter may be configured to provide faster switching speed and increased angle of acceptance and may operate in the rage of approximately 850-1700 nm.

23 Claims, 34 Drawing Sheets

U.S. PATENT DOCUMENTS

| | | | |
|---|---|---|---|
| 6,373,614 B1 | 4/2002 | Miller | |
| 6,403,947 B1 | 6/2002 | Hoyt | |
| 6,417,892 B1 | 7/2002 | Sharp | |
| 6,421,131 B1 | 7/2002 | Miller | |
| 6,455,861 B1 | 9/2002 | Hoyt | |
| 6,501,548 B1 | 12/2002 | Oldenbourg | |
| 6,535,257 B2 | 3/2003 | Miller | |
| 6,552,836 B2 | 4/2003 | Miller | |
| 6,566,143 B2 | 5/2003 | Hoyt | |
| 6,665,072 B2 | 12/2003 | Hoyt | |
| 6,674,527 B2 | 1/2004 | Hoyt | |
| 6,693,710 B1 | 2/2004 | Hoyt | |
| 6,734,962 B2 | 5/2004 | Treado | |
| 6,760,475 B1 | 7/2004 | Miller | |
| 6,781,736 B2 | 8/2004 | Hoyt | |
| 6,882,384 B1 | 4/2005 | Sharp | |
| 6,985,216 B2 | 1/2006 | Treado | |
| 6,985,233 B2 | 1/2006 | Treado | |
| 6,992,809 B1 | 1/2006 | Wang | |
| 7,012,695 B2 | 3/2006 | Maier | |
| 7,084,972 B2 | 8/2006 | Treado | |
| 7,262,839 B2 | 8/2007 | Treado | |
| 7,286,231 B2 | 10/2007 | Maier | |
| 7,336,323 B2 | 2/2008 | Wang | |
| 7,362,489 B2 | 4/2008 | Wang | |
| 7,417,796 B2 | 8/2008 | Wang | |
| 7,573,570 B2 | 8/2009 | Zhang | |
| 7,848,000 B2 | 12/2010 | Wang | |
| 7,859,753 B2 | 12/2010 | Wang | |
| 2001/0033376 A1 | 10/2001 | Hoyt | |
| 2003/0098918 A1 | 5/2003 | Miller | |
| 2006/0038929 A1* | 2/2006 | Wang | 349/18 |

OTHER PUBLICATIONS

Title et al, J. Opt. Eng, 20, p. 815, 1981.
Solc, J. Opt. Soc. Am, 55, p. 621, 1965.
Harris et al, J. Opt. Soc. Am. 54, p. 1267, 1964.
Comptes rendus Hebdomadaires des seances de'Academie des science, 197, p. 1593, 1933.
Ammann, "Synthesis of Optical Birefringent Networks." Progress in Optics IX, pp. 123-177 (1971).
Beckers et al, "Observing the Sun with a Fully Tunable Lyot-Ohman Filter," Applied Optics, vol. 14, No. 9, pp. 2061-2065 (1975).
Call et al, "Application of a Liquid Crystal Tunable Filter to Near Infrared Spectral Searches," SETICon02 (2002).
Chu et al, "Birefringent Filter Synthesis by Use of a Digital Filter Design Algorithm," Applied Optics, vol. 36, No. 7, pp. 1576-1579 (1997).
Deng et al., "Inhomogenous Distribution of Brightness in the Split-Element Filter," Applied Optics, vol. 36, No. 7, pp. 1576-1579 (1997).
Evans, "The Birefringent Filter," J. Opt. Soc. Amer., vol. 39, No. 3, pp. 229-242 (1949).
Katzeenstein et al, "Realization of a New Type of Birefringent Filter," Applied Optics, vol. 10, No. 5, pp. 119-1124 (1971).
Leroy, "Solc Elements in Lyot-Oehman Filters," J. Optics vol. 11, No. 5, pp. 293-304 (1980).
Preuss et al, "Three-Stage Birefringent Filter Tuning Smoothly Over the Visible Region Theoretical Treatment and Experimental Design," Applied Optics. vol. 19, No. 5, pp. 702-710 (1980).
Saeed et al, "Multispectrum, Spatially Addressable Polarization Interference Filter," J. Opt. Soc. Am. A, vol. 19, No. 11, pp. 2301-2310 (2002).
Scheffer, "New Multi color Liquid Crystal Displays that Use a Twisted Nematic Electro-Optical Cell." J. Appl. Physi., vol. 44, No. 11, pp. 4799-4803 (1973).
Shabtay et al. "Tunable Birefringent Filters—Optimal Iterative Design," Optics Express, vol. 10, No. 26, pp. 1534-1541 (2002).
Staromlynska et al. "High-Performance Tunable Filter," Applied Optics, vol. 37, No. 6, pp. 1081-1088 (1998).
Wu, "Design of a Liquid Crystal Based Electrooptic Filter," Applied Optics, vol. 28, No. 1, pp. 48-52 (1989).
Wu et al, "Liquid-Crystal Based Switchable Polarizers for Sensor Protection", Applied Optics, vol. 34, No. 31, pp. 7221-7227 (1995).
Ye, "Liquid Crystal Bandpass Filter Based on the Optical Rotary Dispersion Effect," Applied Optics, vol. 34, No. 20, p. 40007-4010 (2004).

* cited by examiner

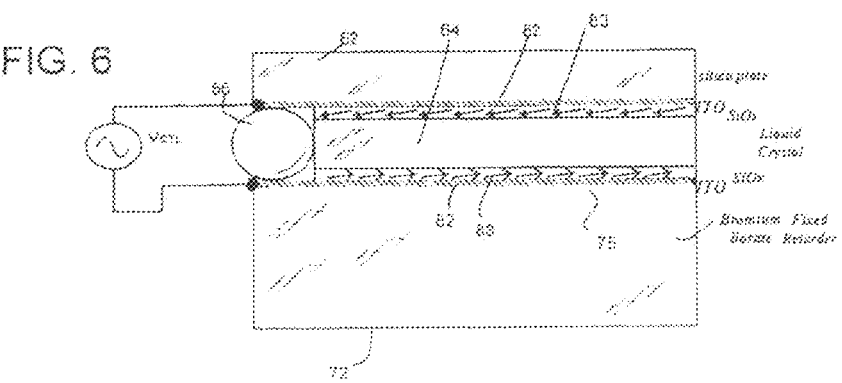
FIG. 6
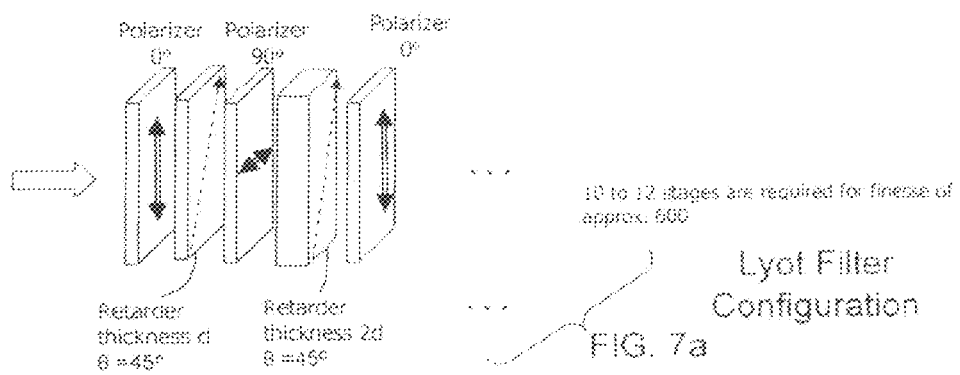
FIG. 7a  Lyot Filter Configuration
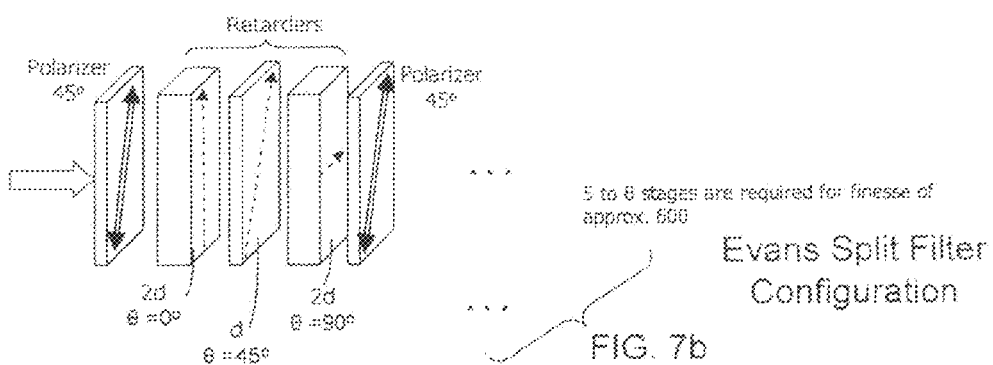
FIG. 7b  Evans Split Filter Configuration

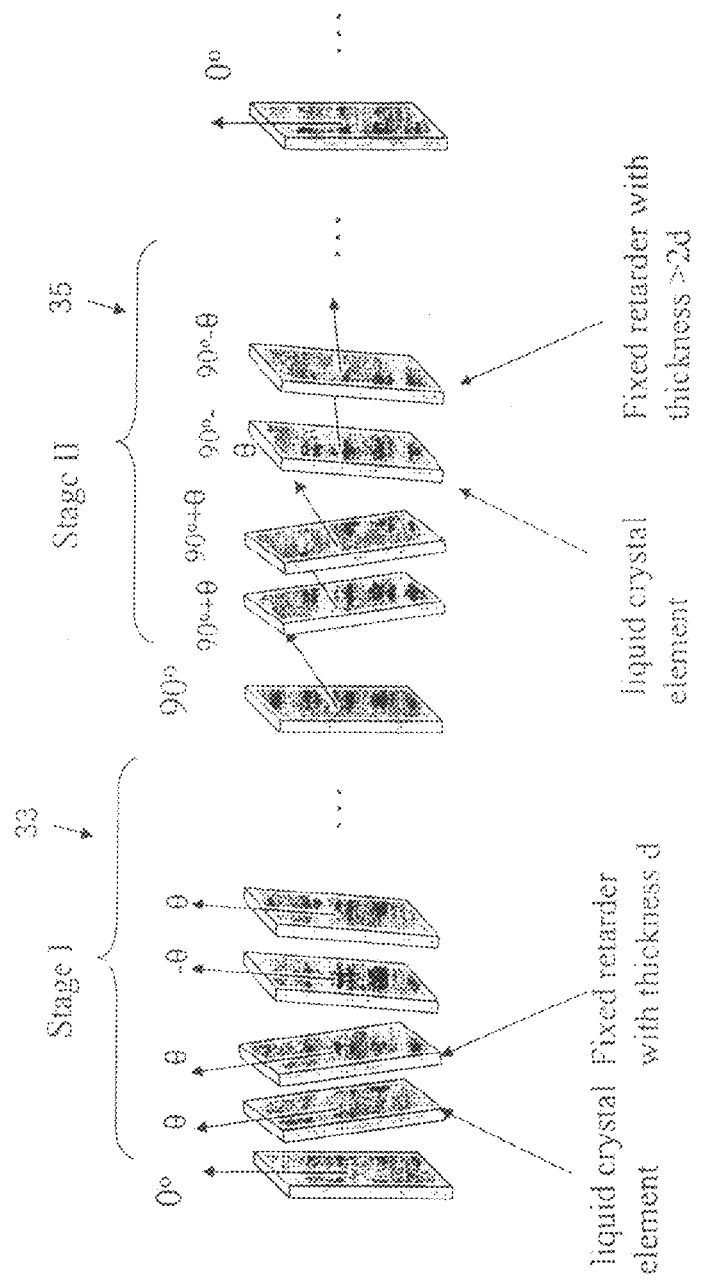

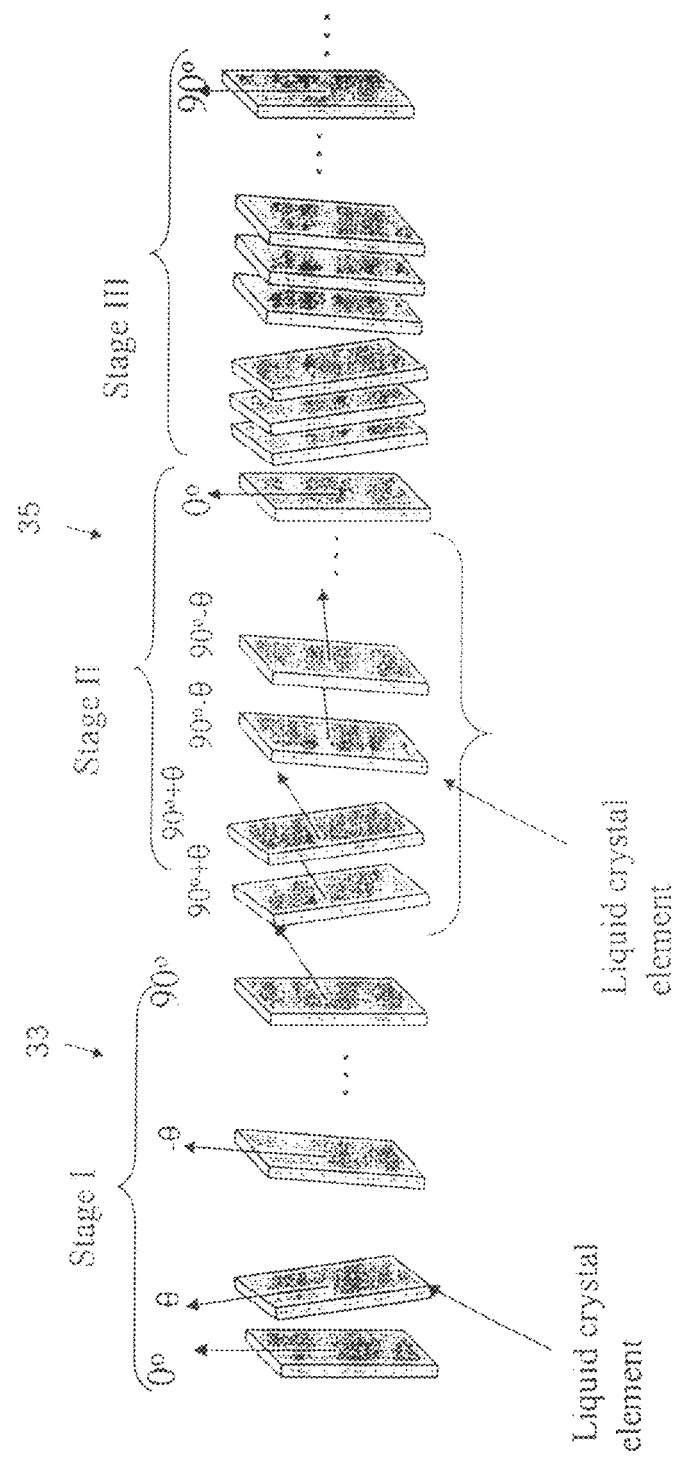

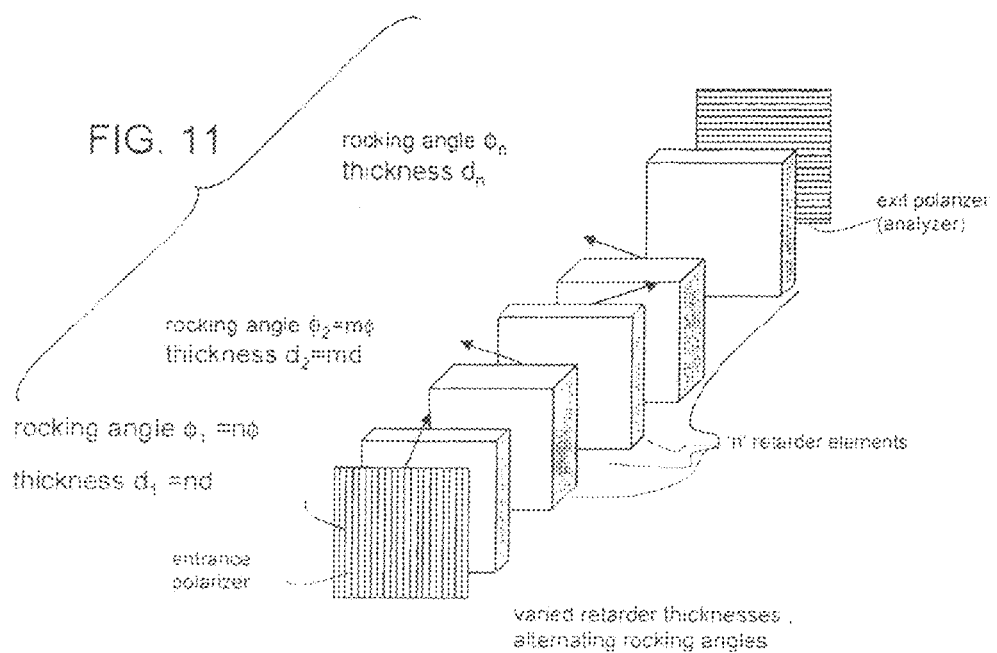
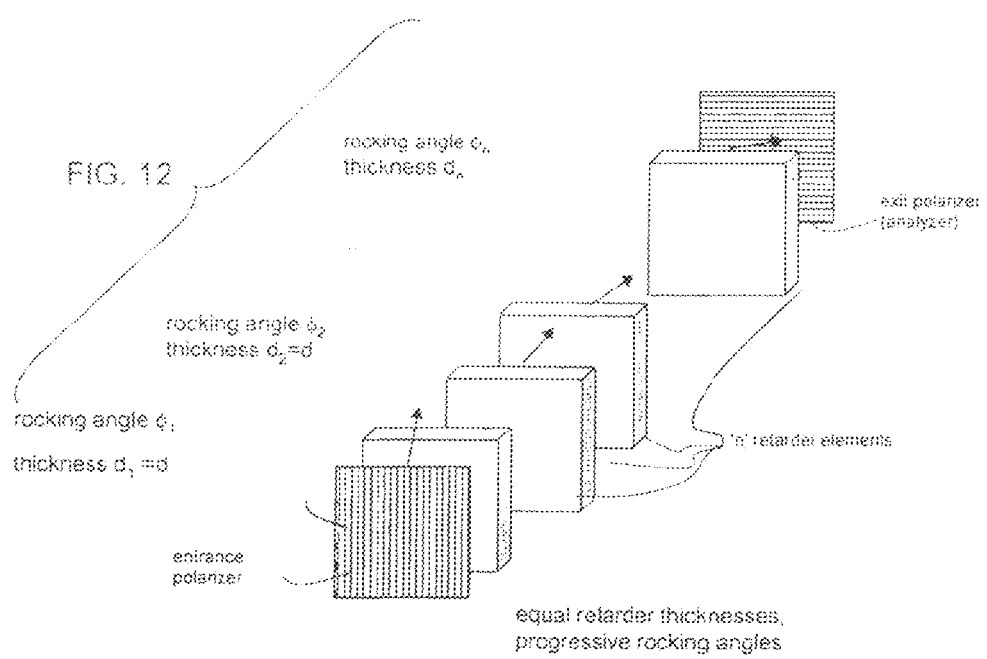

Embodiment 1

| | #1 | #2 | #3 | #4 | #5 | #6 | #7 | #8 | #9 | |
|---|---|---|---|---|---|---|---|---|---|---|
| Stage 1 | | | | | | | | | | |
| | | Ch. 1 | | Ch. 2 | | | | Ch. 1 | | |
| Element | Pol. | LC | LC | LC | LC | LC | LC | LC | LC | |
| D (μm) | 188 | 20 | 20 | 20 | 20 | 20 | 20 | 20 | 20 | |
| Θ (°) | 0 | 2 | 2 | 2 | 2 | 2 | 2 | 2 | 2 | |
| Ψ (°) | 90 | 7 | 7 | 29 | 29 | 61 | 61 | 83 | 83 | |
| Stage 2 | | | | | | | | | | |
| | | Ch. 3 | | Ch. 4 | | | | Ch. 3 | | |
| Element | Pol. | LC | Ret. | LC | Ret. | Ret. | LC | Ret. | LC | |
| D (μm) | 188 | 20 | 600 | 20 | 600 | 600 | 20 | 600 | 20 | |
| Θ (°) | 0 | 2 | 0 | 2 | 0 | 0 | 2 | 0 | 2 | |
| Ψ (°) | 90 | 7 | 7 | 29 | 29 | 61 | 61 | 83 | 83 | |
| Stage 3 | | | | | | | | | | |
| | | Ch. 5 | | Ch. 6 | | | | Ch. 5 | | |
| Element | Pol. | LC | Ret. | LC | Ret. | Ret. | LC | Ret. | LC | |
| D (μm) | 188 | 20 | 800 | 20 | 800 | 800 | 20 | 800 | 20 | |
| Θ (°) | 0 | 2 | 0 | 2 | 0 | 0 | 2 | 0 | 2 | |
| Ψ (°) | 90 | 7 | 7 | 29 | 29 | 61 | 61 | 83 | 83 | |
| Stage 4 | | | | | | | | | | |
| | | Ch. 7 | | Ch. 8 | | | | Ch. 7 | | |
| Element | Pol. | LC | Ret. | LC | Ret. | Ret. | LC | Ret. | LC | |
| D (μm) | 188 | 20 | 1200 | 20 | 1200 | 1200 | 20 | 1200 | 20 | |
| Θ (°) | 0 | 2 | 0 | 2 | 0 | 0 | 2 | 0 | 2 | |
| Ψ (°) | 90 | 7 | 7 | 29 | 29 | 61 | 61 | 83 | 83 | |
| Stage 5 | | | | | | | | | | |
| | | Ch. 9 | | Ch. 10 | | | | Ch. 9 | | |
| Element | Pol. | LC | Ret. | LC | Ret. | Ret. | LC | Ret. | LC | |
| D (μm) | 188 | 20 | 1800 | 20 | 1800 | 1800 | 20 | 1800 | 20 | |
| Θ (°) | 0 | 2 | 0 | 2 | 0 | 0 | 2 | 0 | 2 | |
| Ψ (°) | 90 | 7 | 7 | 29 | 29 | 61 | 61 | 83 | 83 | |
| Stage 6 | | | | | | | | | | |
| | | Ch. 11 | | Ch. 12 | | | | Ch. 11 | | |
| Element | Pol. | LC | Ret. | LC | Ret. | Ret. | LC | Ret. | LC | Pol. |
| D (μm) | 188 | 20 | 2100 | 20 | 2100 | 2100 | 20 | 2100 | 20 | 188 |
| Θ (°) | 0 | 2 | 0 | 2 | 0 | 0 | 2 | 0 | 2 | 0 |
| Ψ (°) | 90 | 7 | 7 | 29 | 29 | 61 | 61 | 83 | 83 | 90 |
| | Simple | MLC-6080 | Quartz | MLC-6080 | Quartz | Quartz | MLC-6080 | Quartz | MLC-6080 | Simple |

FIG. 16

| Specifications | SWIR-MCF |
|---|---|
| Tunable spectral range | 850-1700nm |
| Nominal FWHM | 8 ± 1nm @ 1050nm |
| | 18 ± 2nm @ 1650nm |
| Polarized Transmission | 15±5% @ 1050nm |
| | 25±5% @ 1650nm |
| Out of band (OOB) blocking | $Peak_{in-band}/Peak_{out-of-band}$ 300:1 |
| Angle of acceptance | 3.5 degree half angle |
| Clear aperture | 20±1mm |
| Time response | 50-100ms |
| Blocking filter | Not included |
| Tuning accuracy | ±1 nm at 25°C |
| Temperature control | T-sensor |
| Operating temperature | 10°C to 45°C |
| Temperature correction algorithm | Included for 10°C to 45°C |
| Storage temperature | -5°C to 50°C |
| Computer controller interface | USB 2.0 |

FIG. 17A

| SPECIFICATION | TARGET VALUE |
|---|---|
| Tunable Spectral Range | 850 - 1700 nm |
| Nominal FWHM | 7.5nm @ 1050 nm (9.4) |
| | 11.3nm @ 1250 nm (13.8) |
| | 15.0nm @ 1450 nm (17.6) |
| | 18.8nm @ 1650 nm (22.4) |
| Polarized Transmission | 30 +/- 5% @ 1050nm (19.9%) |
| | 35 +/- 5% @ 1250nm (18.4%) |
| | 30 +/- 5% @ 1450nm (14.4%) |
| | 25 +/- 5% @ 1650nm (10.1%) |
| Out of band blocking ratio: $\text{Peak}_{\text{in-band}} / \text{Peak}_{\text{out of band}}$ | > 300:1 (80~200:1) |
| Angle of Acceptance | 3.5 degree half-angle |
| Clear Aperture | 20+/- 1mm |
| Time Response | 114 ms |
| Blocking Filter | (longpass - 900nm) |
| Tuning Accuracy | +/- 1/8 FWHM |
| Temperature Control | T-Sensor & LUT (T) |
| Operating Temperature | +15°C to +45°C |
| Temperature Correction Algorithm | Included for +15C to +45C |
| Storage Temperature | -5°C to +50°C |
| Driving Voltage | 1 - 4 V |
| Computer Interface Controller | USB |
| Filter Length | 79mm (114mm housing) |
| Date Revised | 8/05/2010 |

FIG. 17B

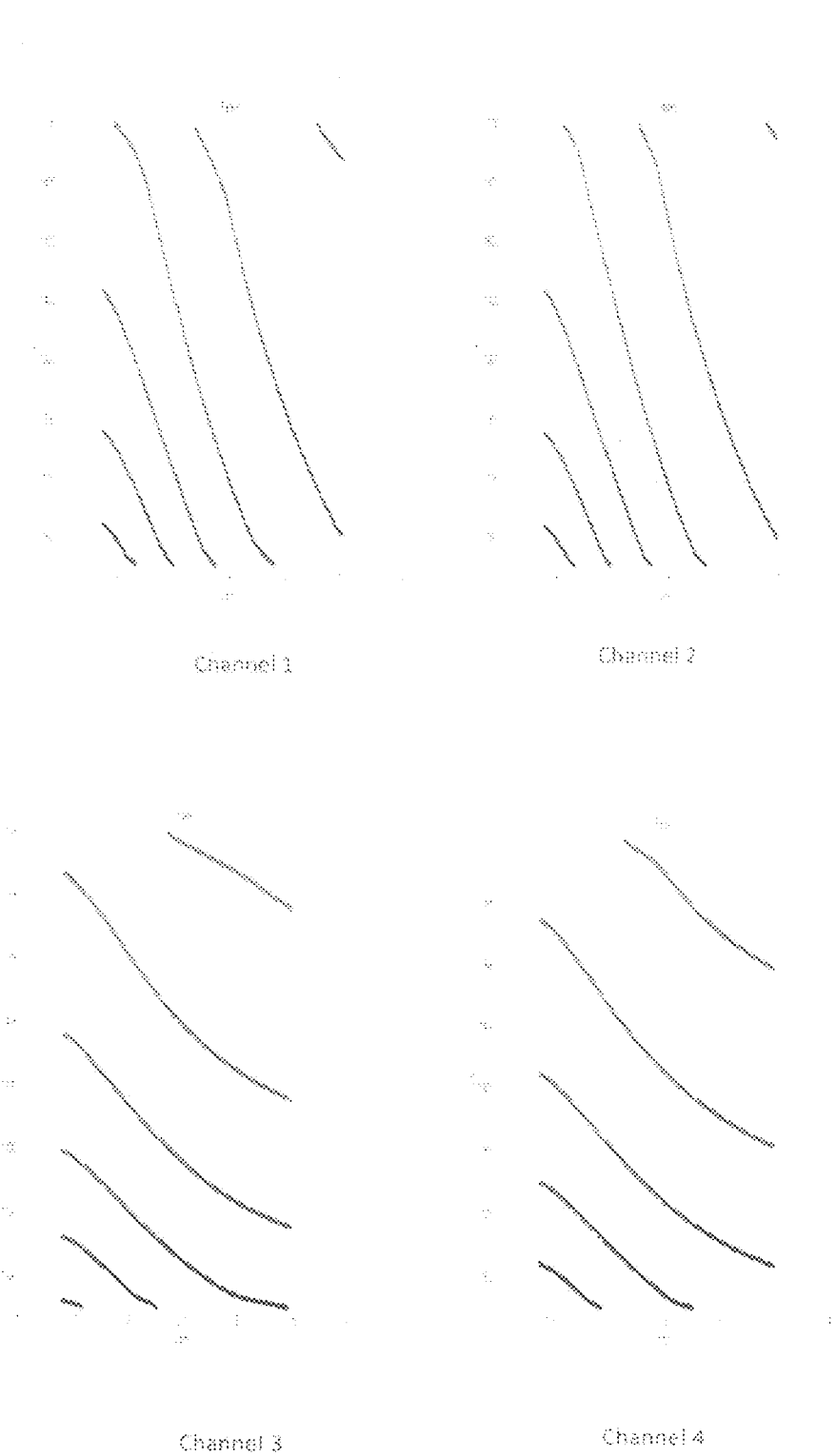
Figure 18A. First data for the design, EOR curves, channels 1-4.

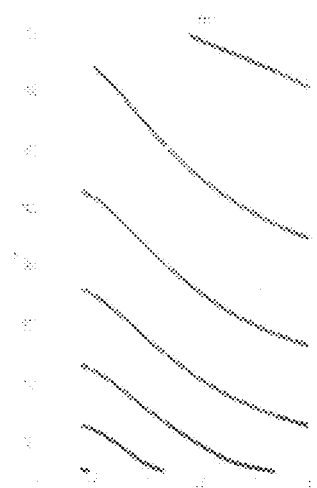 Channel 5
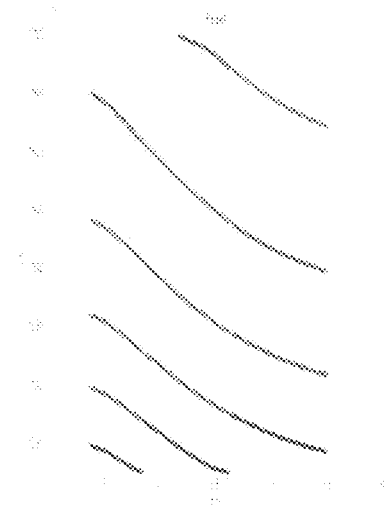 Channel 6
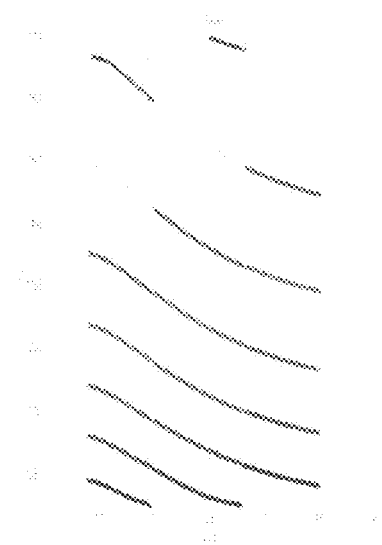 Channel 7
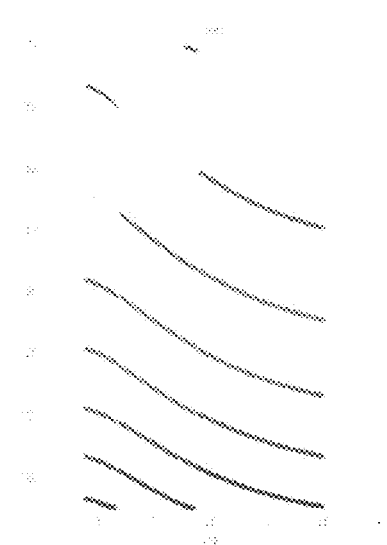 Channel 8
Figure 18E. First data for the design, EOR curves, channels 5-8.

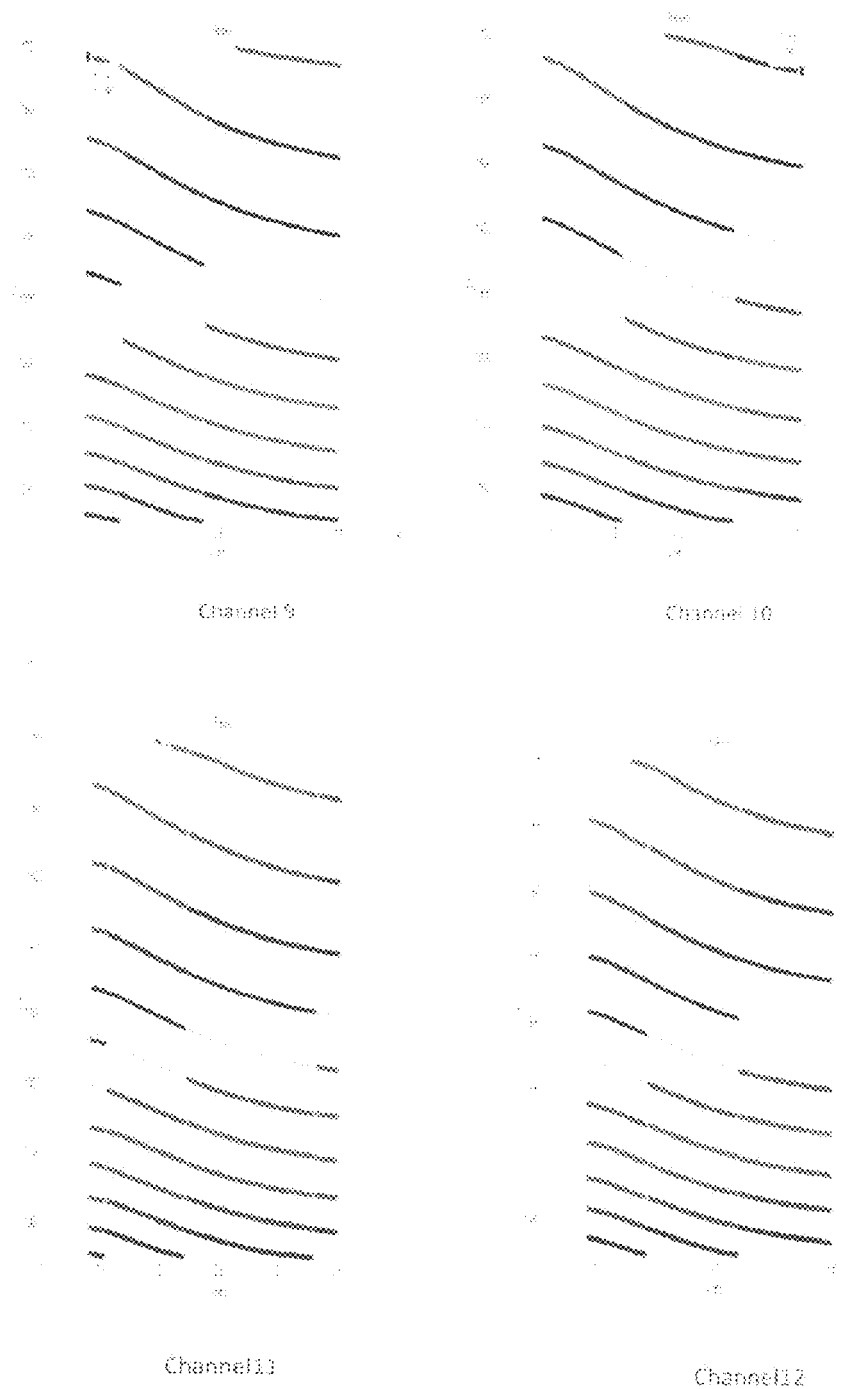
Figure 18C. First data for the design, EOR curves, channels 9-12.

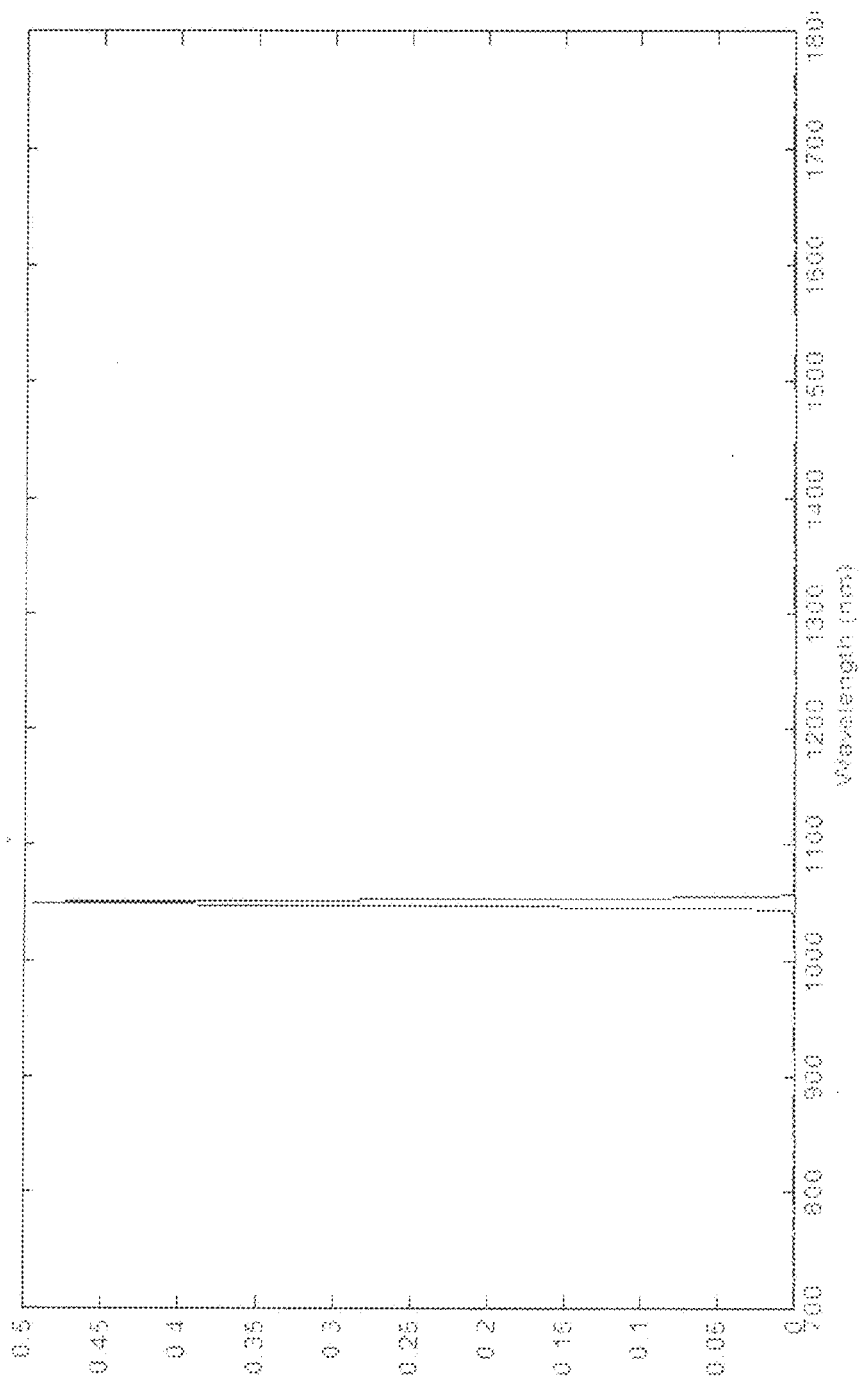

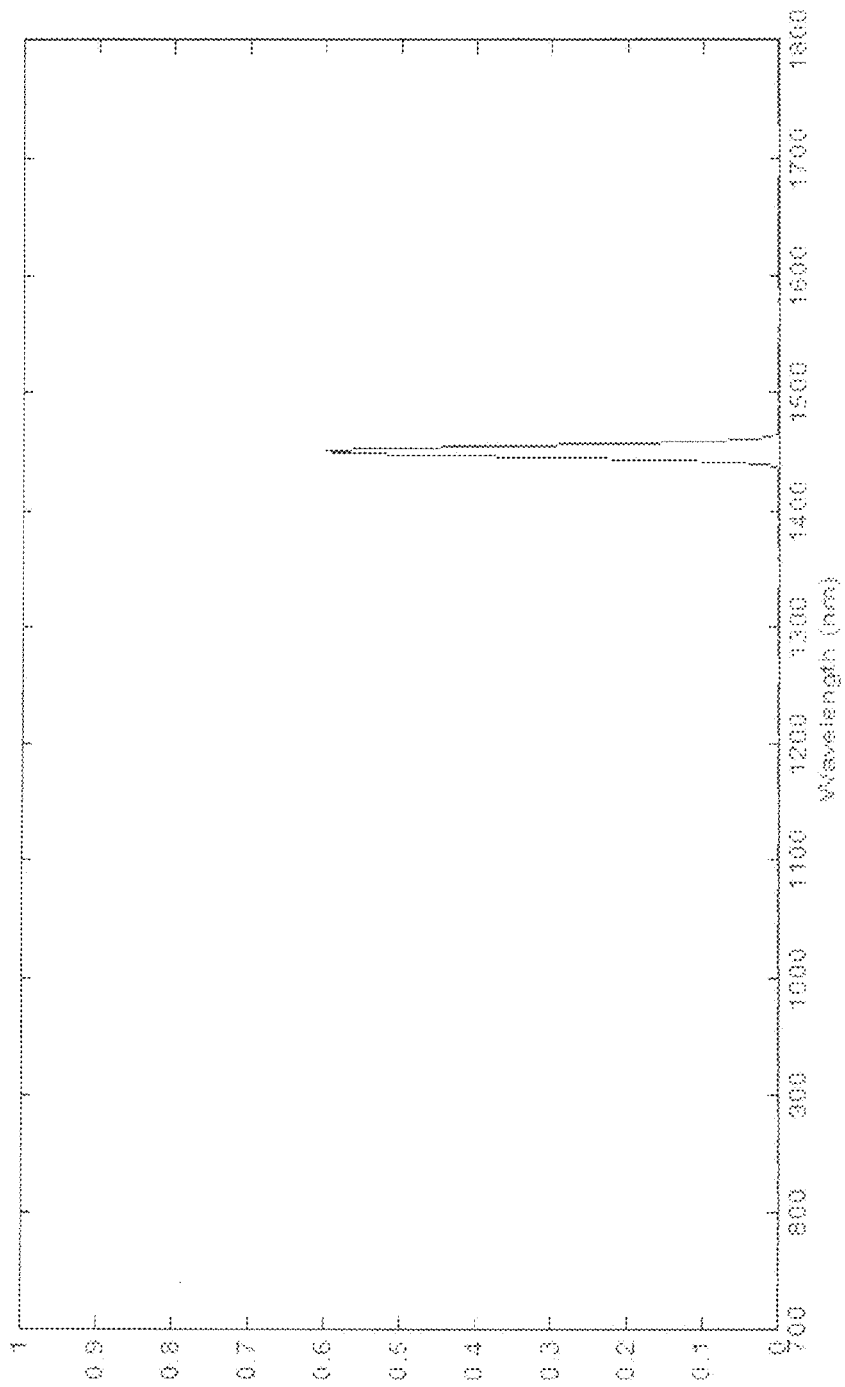
Figure 19B. Spectra, command wavelength at 1450nm.

Embodiment 2

| | #1 | #2 | #3 | #4 | #5 | #6 | #7 | #8 | #9 |
|---|---|---|---|---|---|---|---|---|---|
| Stage 1 | | | | | | | | | |
| Element | Pol. | LC | LC | LC | LC | LC | LC | LC | LC |
| D (μm) | 188 | 10 | 10 | 10 | 10 | 10 | 10 | 10 | 10 |
| Θ (°) | 0 | 2 | -2 | 2 | -2 | 2 | -2 | 2 | -2 |
| Ψ (°) | 90 | 7 | 7 | 29 | 29 | 61 | 61 | 83 | 83 |
| Stage 2 | | | | | | | | | |
| Element | Pol. | Ret. | LC | LC | Ret. | LC | LC | | |
| D (μm) | 188 | 200 | 10 | 10 | 200 | 10 | 10 | | |
| Θ (°) | 0 | 0 | 2 | -2 | 0 | 2 | -2 | | |
| Ψ (°) | 90 | 23 | 23 | 23 | -23 | -23 | -23 | | |
| Stage 3 | | | | | | | | | |
| Element | Pol. | Ret. | LC | LC | Ret. | LC | LC | | |
| D (μm) | 188 | 700 | 10 | 10 | 700 | 10 | 10 | | |
| Θ (°) | 0 | 0 | 2 | -2 | 0 | 2 | -2 | | |
| Ψ (°) | 0 | 67 | 67 | 67 | -67 | -67 | -67 | | |
| Stage 4 | | | | | | | | | |
| Element | Pol. | Ret. | LC | LC | Ret. | LC | LC | | |
| D (μm) | 188 | 1100 | 10 | 10 | 1100 | 10 | 10 | | |
| Θ (°) | 0 | 0 | 2 | -2 | 0 | 2 | -2 | | |
| Ψ (°) | 90 | 23 | 23 | 23 | -23 | -23 | -23 | | |
| Stage 5 | | | | | | | | | |
| Element | Pol. | Ret. | LC | LC | Ret. | LC | LC | | |
| D (μm) | 188 | 2000 | 10 | 10 | 2000 | 10 | 10 | | |
| Θ (°) | 0 | 0 | 2 | -2 | 0 | 2 | -2 | | |
| Ψ (°) | 0 | 67 | 67 | 67 | -67 | -67 | -67 | | |
| Stage 6 | | | | | | | | | |
| Element | Pol. | Ret. | LC | LC | Ret. | LC | LC | Pol | |
| D (μm) | 188 | 4400 | 10 | 10 | 4400 | 10 | 10 | 188 | |
| Θ (°) | 0 | 0 | 2 | -2 | 0 | 2 | -2 | 0 | |
| Ψ (°) | 90 | 23 | 23 | 23 | -23 | -23 | -23 | 0 | |
| | Polarizer | Quartz | MLC6080 | MLC6080 | Quartz | MLC6080 | MLC6080 | Polarizer | |

FIG. 20A

Embodiment 3

| | #1 | #2 | #3 | #4 | #5 | #6 | #7 | #8 | #9 |
|---|---|---|---|---|---|---|---|---|---|
| Stage 1 | | | | | | | | | |
| Element | Pol | LC | LC | LC | LC | LC | LC | LC | LC |
| D (µm) | 188 | 10 | 10 | 10 | 10 | 10 | 10 | 10 | 10 |
| Θ (°) | 0 | 2 | -2 | 2 | -2 | 2 | -2 | 2 | -2 |
| Ψ (°) | 90 | 7 | 7 | 29 | 29 | 61 | 61 | 83 | 83 |
| Stage 2 | | | | | | | | | |
| Element | Pol | Ret. | LC | LC | Ret. | LC | LC | | |
| D (µm) | 188 | 200 | 10 | 10 | 200 | 10 | 10 | | |
| Θ (°) | 0 | 0 | 2 | -2 | 0 | 2 | -2 | | |
| Ψ (°) | 90 | 22.5 | 22.5 | 22.5 | -22.5 | -22.5 | -22.5 | | |
| Stage 3 | | | | | | | | | |
| Element | Pol | Ret. | LC | LC | Ret. | LC | LC | | |
| D (µm) | 188 | 50 | 10 | 10 | 550 | 10 | 10 | | |
| Θ (°) | 0 | 0 | 2 | -2 | 0 | 2 | -2 | | |
| Ψ (°) | 0 | 67.5 | 67.5 | 67.5 | -67.5 | -67.5 | -67.5 | | |
| Stage 4 | | | | | | | | | |
| Element | Pol | Ret. | LC | LC | Ret. | LC | LC | | |
| D (µm) | 188 | 1100 | 10 | 10 | 1100 | 10 | 10 | | |
| Θ (°) | 0 | 0 | 2 | -2 | 0 | 2 | -2 | | |
| Ψ (°) | 90 | 22.5 | 22.5 | 22.5 | -22.5 | -22.5 | -22.5 | | |
| Stage 5 | | | | | | | | | |
| Element | Pol | Ret. | LC | LC | Ret. | LC | LC | | |
| D (µm) | 188 | 2200 | 10 | 10 | 2200 | 10 | 10 | | |
| Θ (°) | 0 | 0 | 2 | -2 | 0 | 2 | -2 | | |
| Ψ (°) | 0 | 67.5 | 67.5 | 67.5 | -67.5 | -67.5 | -67.5 | | |
| Stage 6 | | | | | | | | | |
| Element | Pol | Ret. | LC | LC | Ret. | LC | LC | Pol | |
| D (µm) | 188 | 4400 | 10 | 10 | 4400 | 10 | 10 | 188 | |
| Θ (°) | 0 | 0 | 2 | -2 | 0 | 2 | -2 | 0 | |
| Ψ (°) | 90 | 22.5 | 22.5 | 22.5 | -22.5 | -22.5 | -22.5 | 0 | |
| | Polarizer | Quartz | MCLC6080 | MCLC6080 | Quartz | MCLC6080 | MCLC6080 | Polarizer | |

FIG. 20B

Physical length of filter stack

| Component | Unit length (μm) | Quantity | Total length (mm) |
|---|---|---|---|
| Liquid Crystal Cell | 10μm (MLC6080) 700μm×2 (ITO×2) | 28 | 39.5 |
| Quartz retarder | 200μm | 2 | 16.8 |
|  | 700μm | 2 |  |
|  | 1100μm | 2 |  |
|  | 2000μm | 2 |  |
|  | 4400μm | 2 |  |
| polarizer | 1500μm | 7 | 10.5 |
| Total Filter Stack Length |  |  | 66.8 |

*Note:*
*If using alpha-BBO for stage 6, the total length will be about 58.6mm*

FIG. 21A

| SPECIFICATION | TARGET VALUE |
|---|---|
| Tunable Spectral Range | 850 - 1700 nm |
| Nominal FWHM | 7.5nm @ 1050 nm |
| | 11.3nm @ 1250 nm |
| | 15.0nm @ 1450 nm |
| | 18.8nm @ 1650 nm |
| Polarized Transmission | 30 +/- 5% @ 1050nm |
| | 35 +/- 5% @ 1250nm |
| | 30 +/- 5% @ 1450nm |
| | 25 +/- 5% @ 1650nm |
| Out of band blocking ratio | Peak_in-band / Peak_out-of-band > 500:1 |
| Angle of Acceptance | 7 degree half-angle |
| Clear Aperture | 20 +/- 1mm |
| Time Response | 30-50 ms |
| Blocking Filter | (longpass - 900nm) |
| Tuning Accuracy | +/- 1/8 FWHM |
| Temperature Control | T-Sensor & LUT (T) |
| Operating Temperature | +15ºC to +45ºC |
| Temperature Correction Algorithm | Included for +15C to +45C |
| Storage Temperature | -5ºC to +50ºC |
| Driving Voltage | 1-4 V |
| Computer Interface Controller | USB |
| Filter Length | 67mm |

FIG. 21B

SHORT WAVE INFRARED MULTI-CONJUGATE LIQUID CRYSTAL TUNABLE FILTER

RELATED APPLICATIONS

The present application claims priority under 35 U.S.C. §119(e) to the following U.S. provisional patent applications, hereby incorporated by reference in their entireties: No. 61/324,963, filed on Apr. 16, 2010, entitled "Short-Wavelength Infrared (SWIR) Multi-Conjugate Liquid Crystal Tunable Filter"; and No. 61/403,141, filed on Sep. 10, 2010, entitled "Systems and Methods for Improving Imaging Technology."

BACKGROUND

Optical bandpass filters that rely on birefringence are known in a number of different configurations. Birefringence is a characteristic of certain crystals wherein there is a difference in optical index for orthogonal light components that are aligned to the respective fast and slow axes of the crystal. If a plane polarized input light signal is aligned at 45° to the fast and slow axes a birefringent crystal, for example, the crystal induces a differential phase retardation between a component that is parallel to the slow axis versus the component that is parallel to the fast axis.

The differential retardation produces a change in polarization state of the light that propagates through the crystal. Polarization state is partly a matter of the phase relationship between orthogonal light components. Assuming that the incident light components were in phase and of equal power, etc., differential retardation induces a rotation in the polarization alignment of the light by a rotation angle related to the crystal thickness and birefringence.

The rotation angle is a function of wavelength, because a given difference in propagation time or distance along an optical propagation path (caused by the difference in optical index) amounts to a greater phase angle if the wavelength is shorter, and a smaller phase angle if the wavelength is longer.

In this way, birefringence along an optical path induces a polarization realignment that is a function of wavelength. The effect can provide a wavelength filter. If one passes light through a plane polarizing filter, a birefringent crystal and a second polarizing filter, the combination will discriminate for those wavelengths at which the polarization realignment through the crystal corresponds to the rotational difference in the alignment of the polarizers. This correspondence occurs at multiple wavelengths at which the differential retardation produces rotation in integer multiples of $\pi$ radians)(180°).

There are certain known birefringent filter configurations that use birefringence and polarizing filters to discriminate by wavelength. These filters typically have multiple birefringent retarders and can also have multiple polarizing filters. Examples are the so-called Lyot, Lyot-Ohman, Solc and Evans birefringence filters. One difference between these filters is the manner in which the thicknesses of the multiple retarders are made equal or are varied. Another difference is the manner in which the rotational alignment of the retarders differs. The idea in each case, however, is to provide a polarization state change through the respective retarders that results in alignment of the desired wavelength to the output polarizing filter, and to exclude other wavelengths.

Multiple stages of birefringence and/or polarization filtering can be disposed serially to obtain better wavelength discrimination, but there are complications. For example, if the stages have bandpasses that are not well aligned, particularly if subject to tuning, then desired light energy may be blocked rather than passed. Each successive filter stage is likely to cause some transmission loss. There is a tradeoff between design choices that might make the wavelength bandpass more discriminating versus choices to improve the ratio of passed light energy. Each polarizer typically has an inherent transmission loss, even with respect to light energy that is plane polarized and aligned to the polarizer. The particular loss varies with the wavelength and the polarizer used, but might be, for example 12%. If a large number of stages are needed to provide a high degree of discrimination or a very narrow bandpass, the level of light energy passing the filter may be low. A low transmission ratio may require that light energy be collected for a relatively long time to obtain an image or a measurement.

Discrimination for a particular wavelength by altering polarization state produces a wavelength-periodic result. If the differential delay is $2\pi$ radians or an integer multiple thereof, for example, the effect is the same as no delay. Considering plane polarizers, if a polarization state is changed by a differential phase delay of an integer multiple of $\pi$ radians) (180°), the rotated polarization state is again parallel to the polarizer. For these reasons, filters having one or more retarders and plane polarizing filters pass light at multiple wavelengths.

Birefringence interference filters with plural stages were developed for observing solar spectra. The retarder birefringence and thickness parameters were chosen to pass certain very specific, narrow and well defined spectral lines in the emission spectrum of solar radiation. Sub-angstrom spectral resolution is said to be obtained using the filter developed by B. Lyot (See, Comptes rendus 197, 1593 (1933)). A basic Lyot filter comprises a number of filter stages placed successively along a light path. (See, Yariv, A. and Yeh, P. (1984) Optical Waves in Crystals, Chapter 5, John Wiley and Sons, New York). Each stage has a birefringent crystal element (a retarder) between parallel polarizers. The exit polarizer of one element can function as the input polarizer of the next element.

Lyot birefringent crystals have optical axes parallel to the interface and rotated by 45 degrees to the direction of the input polarization, thus dividing the light from the input polarizer into two components divided equally between the fast and slow axes of the birefringent crystal. In propagating through the crystal, the component on the slow axis becomes retarded relative to the component on the fast axis. The polarization orientation of the light is altered as well. At the output, the exit polarizer at 45 degrees to the preceding crystal retains equal proportions the retarded and the un-retarded components, but passes only that wavelength or wavelengths for which the angular polarization change through the crystal is the same as the relative alignment of the input and output polarizers (or that differs by an integer multiple of 180 degrees).

A Lyot filter has a repetitive layout of crystals between polarizers, each the crystals and their polarizers being relatively aligned at 45 degrees. The phase differences in Lyot are introduced in part because the thickness of each stacked birefringent crystal elements is different. The thickness and the birefringence each contribute to the retardation introduced. In the Lyot configuration, the retardation produced by the crystal at each stage is precisely twice the retardation from the crystal at the preceding stage. The bandpass wavelength is related to the thickness and birefringence of the crystals.

The successively varying stage thicknesses are selected (e.g., 1d, 2d, 4d, 8d, etc. for Lyot) with regard to the relative rotational alignment of the successive stages, so as to provide an arithmetic, geometric or other mathematical progression. The operation of the stages can be modeled mathematically and tested empirically. Multiple stage crystal devices have been demonstrated with 0.1 angstrom resolution (Title, A. M. and Rosenberg, W. J. Opt. Eng. 20, 815 (1981)). In order to achieve such resolution, dimensional precision is necessary, which makes the filters expensive. Often, resolution is improved simply by adding to the number of successive cells, sometimes using a large number of successive cells. This has the disadvantage of reducing the proportion of light that is transmitted versus the proportion that is rejected. Such filters are suited for astronomical applications wherein the filters are tuned to specific lines of the solar spectrum, where the source, like the Sun, is very bright.

Another configuration of stacked crystal filter was developed by I. Solc. Like Lyot, the Solc filter uses multiple birefringent crystals in a stack, but unlike Lyot, the Solc filter uses equal retarder thicknesses and does not require a polarizer between each retarder. The Solc configuration requires that the orientation of the successive retarders have a particular relationship, specifically to distribute evenly among successive retarders a rotational progression of the desired wavelength by a specific rotational angle. A single output polarizer (sometimes called the analyzer) is oriented at the corresponding rotational angle and receives and passes the desired wavelength. Solc filters are described, for example, in Solc, J. Opt. Soc. Am. 55, 621, (1965).

The relative rotational angles between each birefringent crystal and the next preceding or succeeding crystal in a Solc configuration thus represent fractions of the rotation angle between the entrance and analyzer polarizers that precede and follow the stack of retarders. The Solc "fan" filter configuration has N identical crystals with rotation angles of $\theta$, $3\theta$, $5\theta$ ... $(2N-1)\theta$, located between parallel polarizers where $\theta=\pi/4N$, and N is the number of crystals in the stack. Thus, Solc fan angles are progressively more rotated in a same direction. The Solc "folded" configuration has N identical crystals oriented at $\pm\theta$ with respect to the incoming polarization where $\theta$ is the angle which the optic axis the crystal makes with the transmission axis of the entrance polarizer. The folded design has alternating orientations and uses crossed polarizers, but otherwise operates in the same way as a fan configuration to orient the polarization state of the selected bandwidth so as to pass the exit polarizer. Among other varieties of recognized Solc configurations are the Solc Gaussian and Solc sinc configurations.

For example, a Solc "fan" arrangement might have four retardation elements and parallel polarizers. In such a Solc "fan" arrangement of four crystals (N=4), the first crystal is rotated 11.25 degrees relative to an input polarizer. The successive crystals are rotated by 22.5 degrees relative to the next preceding crystal. The output or analyzer polarizer is parallel to the entrance polarizer. A four retarder Solc "folded" arrangement by comparison has four stacked crystals placed alternately at clockwise and counterclockwise rotation angles relative to the polarizer, such as +11.25 degrees, −11.25, +11.25, and so on, and the analyzer polarizer is perpendicular to the entrance polarizer. Other variants are possible with different values for N, $\theta$ and the orientation of the polarizers.

In Harris et al., J. Opt. Soc. Am. 54, 1267, (1964), it is posited that any filter transmission function might be generated, in principle, using a stack of properly configured retardation plates. Researchers have used the network synthesis technique, along with standard signal processing methods, to generate filter designs based on this premise. These designs have sought high resolution over a limited spectral range, as opposed to a broad spectral range. The filters typically have fixed retardation elements. When tuning is to be considered, the retardances can be varied in unison.

Known multiple-retarder configurations of the type described each have advantages and disadvantages. In a Solc configuration, for example, the crystals are all of the same thickness. Equal retarder stages may be less expensive and more easily manufactured than coordinated varying thicknesses. A larger number of stages will fit in a longitudinally shorter stack than in a Lyot configuration with progressively varying thicknesses. A Solc configuration uses relatively fewer polarizers than some of the alternatives.

There exists a need for a highly accurate optical filter configured to operate in the short wave infrared range that may be utilized for spectroscopic and hyperspectral imaging configurations. It would also be advantageous for such a filter to provide for fast switching speeds and a high out-of-band ratio.

SUMMARY OF THE INVENTION

The present disclosure relates to optical filters, including spectral imaging filters. More specifically, the present disclosure provides for an optical filter configured so as to operate in the short-wave infrared range of approximately 850-1700 nm. The filter of the present disclosure holds potential for detection and identification of materials and agents, including hazardous agents for threat detection. The filter may also be applied in areas such as anatomic pathology, ingredient-specific particle sizing, and forensics.

The filter of the present disclosure overcomes the limitations of the prior art by providing for high transmission while maintaining an excellent out-of-band rejection ratio. The advantages of the present disclosure also include fast tuning speed and high accuracy.

BRIEF DESCRIPTION OF THE DRAWINGS

In the drawings:

FIG. 6 is a schematic illustration of a tunable element to serve as a controllable birefringence as in the embodiment of FIG. 2.

FIG. 7A is a schematic illustration of a stacked retarder birefringence filter generally according to a Lyot configuration.

FIG. 7B is a schematic illustration of a stacked retarder birefringence filter generally according to an Evans split configuration.

FIG. 9 is a schematic illustration of a two stage multi-conjugate filter according to the invention, with cooperating elements respectively having fixed and tunable retardations, and with distinct birefringence values. In this example, the stages each have a Solc configuration.

FIG. 10 is a three stage schematic illustration of a multi-conjugate filter configuration demonstrating the coupling of retarder elements with similar rocking angles as a technique to provide distinct retarder thicknesses.

FIG. 11 is a schematic illustration showing a novel generalized multi-conjugate filter stage, having an arrangement characterized by retarders of different thicknesses, wherein the retarders are arranged at rotation angles according to their thickness relationship, as discussed in more detail below.

FIG. 12 is a schematic illustration showing a generalized multi-conjugate filter stage in another configuration showing another technique for birefringence wavelength filtering.

FIG. 16 is illustrative of a configuration of a filter of the present disclosure.

FIGS. 17A-17B are representative of specifications of a filter of the present disclosure.

FIGS. 18A-18C are representative EOR curves for various channels of a filter of the present disclosure.

FIGS. 20A-20B are representative of configurations of a filter of the present disclosure.

FIGS. 21A-21B are representative of specifications of a filter of the present disclosure.

DETAILED DESCRIPTION

Figure 1:
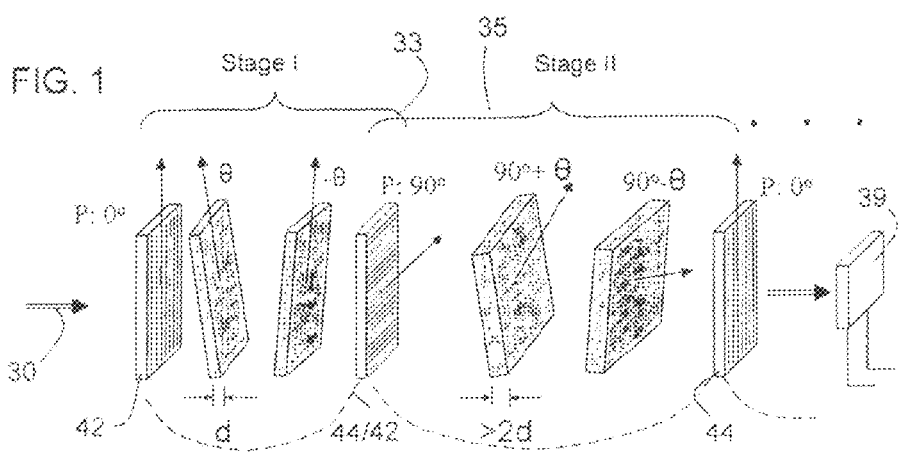
FIG. 1 is a schematic illustration of a multi-conjugate liquid crystal filter for spectral imaging applications and the like, according to the invention.

Reference will now be made in detail to the preferred embodiments of the present disclosure, examples of which are illustrated in the accompanying drawings. Wherever possible, the same reference numbers will be used throughout the drawings to refer to the same or like parts.

The invention concerns optical filters having tunable wavelength pass bands, for use in hyperspectral imaging. Inventive filter configurations are provided with conjugated stages having distinct attributes. Stages with narrow periodic wavelength passbands are serially arranged with stages having large free spectral range.

The filter stages comprise serially placed birefringent retarders and polarizers. The retarders have thickness and rotational relationships designed to pass selected wavelengths. The retarders can use one or more liquid crystal tunable elements for all or a tunable part of their total retardation.

In the context of the present invention, birefringent stacked filters are applied to a spectral imaging apparatus such as a high performance spectral imaging system. In one embodiment, this spectral imaging system may comprise a short wave infrared hyperspectral imaging system. Such imaging applications require a narrow bandpass and a high finesse (defined as the ratio of free spectral range to bandwidth: FSR/FWHM). The filter also needs to be tunable to selected wavelength pass bands. According to the invention, performance is improved by serially concatenating particular filter stages to provide a multi-conjugate filter configuration. The specific filter stages are subject to a number of alternative embodiments as described hereinafter.

Fixed retarders, also referred to herein as "passive retarders," provide a phase delay determined by the birefringence of the crystal and the thickness of the crystal along the propagation axis. Electrically tunable birefringence filters have been proposed using liquid crystals as the tunable element. Tunable liquid crystal birefringence elements are also referred to herein as "active retarders." The birefringence of a liquid crystal typically is variable as a function of the amplitude of an electric field applied to the crystal. Changing the birefringence of a liquid crystal produces an effect that is similar to substituting a fixed retarder of a different thickness.

In a multi-conjugate stacked element filter, the tunable elements are adjusted in a coordinated fashion. In a configuration with equal retardation elements, the aligned at successive rotational displacements, the elements can be tuned in unison. An input polarizer can establish a reference polarization alignment. Any number of elements can be stacked in the body of the filter, with a larger number of elements generally providing higher resolution than a smaller number of elements. At least one output polarizer passes only the wavelengths that emerge from the stack with the nominal predetermined polarization alignment.

There are several choices for wavelength bandpass filter configurations that might be considered for a given use. There are constraints, however, that affect the choice, including performance considerations such as bandpass resolution and finesse. A high transmission ratio may be needed to obtain an acceptable signal strength, signal to noise ratios or image collection speed. A very bulky configuration may be unsuitable for desktop and portable applications. Another important measure is cost.

It is an object of the invention to produce a wavelength bandpass filter with very good optical and operational characteristics, suitable for SWIR imaging as well as other potentially demanding spectral imaging applications, at a reasonable cost. The term "spectral imaging" is construed as including but not limited to developing a spatially accurate wavelength-resolved two dimensional image of a subject in selected wavelength images. Spectral imaging may include hyperspectral imaging.

The invention can employ one or more of the multi-conjugate filter configurations as discussed (e.g., Solc, Lyot, Evans, etc.). Multi-conjugate filter configurations may comprise technology available from ChemImage Corporation, Pittsburgh, Pa. This technology is more fully described in U.S. Pat. No.: 7,362,489, filed on Apr. 22, 2005, entitled "Multi-Conjugate Liquid Crystal Tunable Filter" and U.S. Pat. No. 6,992,809, filed on Feb. 2, 2005, also entitled "Multi-Conjugate Liquid Crystal Tunable Filter," which are hereby incorporated by reference in their entireties. Alternatively, embodiments can employ an alternative and novel filter configuration as disclosed herein, characterized by retarder birefringence values (typically retarder thicknesses) that are different for the respective retarders within a stage and are coordinated with rocking angles to achieve the required interference filtering function. In either case, serial stages are arranged such that the finesse factors available from each of the successive stages multiply. The individual stages may be modestly discriminating (e.g., with a finesse of four or six). The stages have overlapping passbands and the finesse values of the filter stages multiply to provide a high finesse transmission function for the conjugate filter as a whole. In this context, the serial arrangement is a succession of complete filters stages as opposed to a succession of birefringence retarder elements that typically form one filter stage. Each successive stage can have one or more polarizers to define a reference orientation of the input, optional polarizers between retarders in the stages (e.g., as in Lyot configurations) or between stages (as in Solc configurations), and an output polarizer or analyzer.

A further object is to apply the concept of staged electrically controllable birefringence filters to the generalized class of birefringence filters comprising stacked retarder elements, namely to employ electrically biased liquid crystals for at least part of the birefringence of one or more retarders in the stages of wavelength filters configured according to the stacked retarder arrangements disclosed herein.

The discrete birefringence elements (retarders) in each stage can comprise single liquid crystal variable birefringence retarders, in units or in stacks. The liquid crystal retarders can provide the full retardation or can adjoin fixed retarders at the same orientation, whereby the liquid crystal elements add a controllable amount of retardation to that of the fixed retarders.

By providing stages of retarders that have different birefringence (for example, different thicknesses), the superimposed effects of serial stages are overlaid to produce the transfer function of the filter as a whole. A set of stages that individually have mediocre finesse, can have a very high finesse when their transfer functions are superimposed and provide at least one passband that is included in the transfer functions of all the superimposed stages. For example, a stage may have good free spectral range ("FSR") (i.e., a long span between periodically repeating bandpass peaks), although that stage may have a relatively wide bandwidth at its peaks (i.e., a disadvantageously large full wave half maximum ("FWHM") bandwidth). Among one or more previous or successive stages are included stages configured for advantageously narrow FWHM, although perhaps those stages may have a disadvantageously short FSR. By coordinating the stages, and in particular by overlapping the passbands of two stages as described, the conjugate filter comprising both stages has the narrower FWHM and the longer FSR. These values of the two stages, the ratio of which is the finesse, are multiplied to provide the finesse value of the conjugate.

One or more of the conjugate filter stages as described is tunable. It is possible to include one or more stages that exclusively employ fixed retarders and thereby produce a transfer function that has fixed peaks, provided that selectable peaks can be overlapped by tuning other stages. In that case, the filter passband is not continuously tunable, but serial superimposition of the transmission characteristics of the stages benefits from a wide free spectral range of some stages and narrow selected bandpass FWHM values of other stages. Preferably, the succession of selectable wavelengths that are sufficiently numerous and/or closely spaced to encompass reflective, fluorescent or other emissions of a sample to be imaged.

In certain embodiments, the multi-conjugate filter of the invention can provide high finesse spectral filters wherein the ratio of transmitted light energy is high. Generally this involves selecting filter configurations that use only a limited number of polarizers, so as to limit passband rejection losses.

In these and other embodiments, the inventive multi-conjugate filter is optimized to balance design considerations, including transmission ratio, side-lobe rejection, manufacturing and material costs, manufacturing tolerance and complexity, as well as operational complexity such as to limit the number of independently controllable tuning channels required.

Other advantages include the capability to use low dispersion liquid crystal material to achieve a wide free spectral range. Part of the retardation can be contributed by fixed retarders and part by liquid crystals. In certain embodiments, the materials are chosen to match indices and eliminate the need for anti-reflection coating. By selection of polarizer and retarder materials, the multi-conjugate filter can be embodied for operation from ultraviolet (UV) to near infrared (NW) or midwave infrared (MWIR).

The multi-conjugate filter arrangements according to the invention generally have architectures that are apt for various spectral imaging applications. Typically (but not exclusively), multi-conjugate filters having fixed retarders with adjoined liquid crystals are apt in SWIR imaging applications wherein the liquid crystals are controlled in a coordinated way to adjust the bandpass wavelength. Multi-conjugate filters that use liquid crystal retarders without fixed retarders may also hold potential for SWIR imaging. Combinations of these types can also be used.

These and other aspects will be made apparent by the following discussion and detailed disclosure of nonlimiting examples intended to demonstrate the invention of which the scope is defined in the following claims.

In some spectral imaging applications, it is advantageous for a filter to have a very narrow bandwidth while also being readily tunable. At the same time, it is desirable to have a strong signal level at the ultimate light responsive sensor elements, so as to have a good signal to noise ratio while obtaining images relatively quickly. It is a challenge to serve all these purposes at once, leading to design tradeoffs. According to an aspect of the invention, an optimized arrangement is provided to obtain tight bandwidth discrimination, high transmission ratio and tunability at least to a set of selectable wavelength bands. This is accomplished by employing multiple tunable wavelength bandpass filter stages in series.

Any one of the stages need have only a modest value of finesse, because provided that the respective stages have bandpass characteristics wherein a desired bandpass peak appears in the transfer functions of each of the stages (i.e., at least one peak overlaps), the filter benefits from the salutary aspects of each stage. Finesse is the ratio of free spectral range FSR (namely the wavelength span between bandpass peaks) versus the bandwidth of the peaks FWHM (full width measured at half maximum level). The finesse of a stacked stage multi-conjugate filter arrangement is the product of the finesse values of the stacked stages. The remaining requirement is tuning to provide one or more passbands found in the transfer functions of all the stages, whereby that passband (or set of passbands) defines the FWHM of the conjugated stages. The free spectral range of the conjugated stages of the filter as a whole is defined not only by the highest value of free spectral range for the serially disposed stages, but also by the fact that tuning can selectively align and misalign passbands among the stages effectively to discriminate for specific narrow passbands.

The characteristics of a filter stage are determined from a combination of dimensional and optical factors and characteristics. By choosing among alternatives of birefringence, retarder number and thickness, and rotational arrangement of the retarders (known as rocking angle in certain configurations), different combinations of free spectral range (FSR) and full width half maximum passband width (FWHM) can be achieved. Normally, a selection of retarders for a periodic interference filter that has a high (desirable) FSR will have a wide (undesirable) FWHM and vice versa. The retarders in a multi-conjugate filter stage according to the invention are chosen such that some of the serially arranged have high FSR and others have narrow FWHM, at least one passband of the stages overlapping to define the multi-conjugate filter passband(s). Preferably, in order to produce distinctly different combinations of FSR versus FWHM bandwidth, the birefringence of the elements comprised by one stage is made distinctly different from the birefringence of elements in another stage. As a result, the stages differ as to their respective contributions of free spectral range between periodic peaks (which is desirably large) versus the bandpass width of the individual peaks (which is desirably narrow). Other things being equal, a stage with a greater birefringence (typically greater retarder thicknesses) has advantageously narrower bandpass peaks than an otherwise comparable stage with less birefringence. That stage (with thicker or more birefringent retarders), however, has a disadvantageous short range between peaks. Conversely, a thin retarder stage (with lower birefringence) has wide bandpass peaks (peaks with poorer resolution) but the peaks are more widely spaced.

The thickness of the retarder stages is a matter that is different for different configurations of stacked retarder filters.-Known Lyot, Evans and Solc configurations of birefringent wavelength filters each have specific characteristics by which interfering frequencies and polarization components filter for wavelength. According to the present invention, additional novel configurations also can be used, wherein a generalized succession of retarders is provided, with different specific thicknesses coordinated with their rotational orientations. Solc filter configurations, for example, have equal retarder thicknesses whereas Evans and Lyot use single and double thickness retarders, as well as other differences including the rotational alignment of the retarders and the use and/or rotational arrangement of polarizing filters. The novel configurations described herein may implement retarders with integer multiple retarder thicknesses. The aspect of the invention that concerns superimposing transfer functions that respectively supplement one another's finesse is applicable generally to multi-conjugate filters as described, and is not limited to the particular configuration of retarder thickness relationships or the like.

The transmission functions of the serially disposed filters apply progressively to the passing light signal. The transfer functions multiply. The finesse ratio of the overall multi-stage filter is the mathematical product of the finesse ratios of the stages. By serially applying the transfer functions of a stage with low birefringence to the output of a stage with higher birefringence (or vice versa), it is possible by action of the lower birefringence stage to select one bandpass peak in the succession of closely spaced narrow peaks provided by the higher birefringence stage. The multiplied transfer functions advantageously produce narrow peaks and wide free spectral range between peaks.

Preferably, both stages (or more than two stages if provided) are each tunable such that their bandpass characteristics are coordinated to enable tuning to any desired wavelength in a tuning band. It is possible to tune the lower birefringence element to select discrete narrow bandpass peaks from the transfer function of the higher birefringence element. If the lower birefringence element is sufficiently tunable, the tunable peaks can be used to select a narrow band in the transfer function of the higher birefringence element.

FIG. 1 is a simplified schematic diagram showing a multi-stage birefringent filter according to the invention. A light input signal, developed for example by microscope optics trained on a laser illuminated sample (not shown) produces a light signal 30 shown schematically as a single beam. Pixilated and focused arrangements are possible; however the invention is directed to techniques for discriminating for particular wavelengths in the light signal, preferably including selection of wavelengths by tuning controllable elements that are not shown in FIG. 1. A serial set of stages are disposed along the path of light signal 30, which passes through the plural filter stages 33, 35 and a set of wavelengths according to the transmission spectra of the stages 33, 35 is collected at a photodetector 39. Typically the photodetector is coupled in turn to a digitizer (not shown) or other means for processing the signal to develop data representing the light energy or amplitude at the bandpass wavelengths.

The stages 33, 35 have cooperating elements including at least one polarizing filter 42, 44, and a series of birefringent retarders having respective thicknesses and being disposed at relative rotational angles as shown. There are a number of different specific filter configurations possible, several configurations being discussed herein as examples.

In FIG. 1, the incoming light signal 30 encounters an entrance polarizer 42 oriented at some reference angle that can be considered "zero" degrees. The entrance polarizer establishes a reference polarization alignment of the light at all incident wavelengths. A succession of birefringent retarder elements 45, 47 in a given stage produces a differential delay between components that are parallel to or orthogonal to the respective reference axes of each retarder. The retarders rotate the polarization alignment of the light, in a way that varies with wavelength. The filter stage is configured so that a desired bandpass wavelength emerges at a polarization alignment that permits the bandpass wavelength to pass through a subsequent polarizer 44/42. This process is repeated with multiple retarders arranged between polarizers. Each serves to improve the discrimination of the filter as a whole.

As shown in FIG. 1, the first retarder encountered by light signal 30 upon emerging from polarizer 42 is shown oriented at angle $\theta$ relative to the input polarizer. A second retarder is then encountered and is oriented at a different angle, in this example negative $\theta$. The two relatively retarded polarization components produced by the initial retarder encounter the second retarder at an orientation that is partly parallel and partly orthogonal to the director of the second retarder. The second retarder then induces a differential delay in turn. The succession of retarders produces a group of interfering successively wavefronts. (At least two retarders are provided in this embodiment, but any number is possible.)

The extent of differential delay through any given retarder is the same across the wavelength spectrum in terms of propagation distance, but a given propagation delay or distance results in differential phase delay that is a function of wavelength. As a result, the polarization alignment of the light propagating through the retarder is caused to vary as a function of wavelength. The light signal proceeds to a polarizer 44/42 in FIG. 1, which likewise has an orientation, in this example, rotated 90 degrees from the input polarizer 42. The polarizer 44/42 functions as a selective filter passing only those wavelengths for which the phase retardation was such that the light at that wavelength has been aligned to the polarizer 44/42.

The specific retardations and optical axis orientations of the retarders are related to one another and chosen in a manner that causes selected wavelengths to emerge at the polarization alignment needed whereas the following polarizer 44/42 blocks other alignments (namely other wavelengths). The retarders act to spread the polarization alignment of the input light over a range of rotation angles as a function of wavelength. The polarizer 44/42 acts as the selective element or analyzer permitting the selected wavelength to proceed through stage 33 in FIG. 1, and also acts as the reference-establishing input polarizer for the following stage 35.

Figure 2:
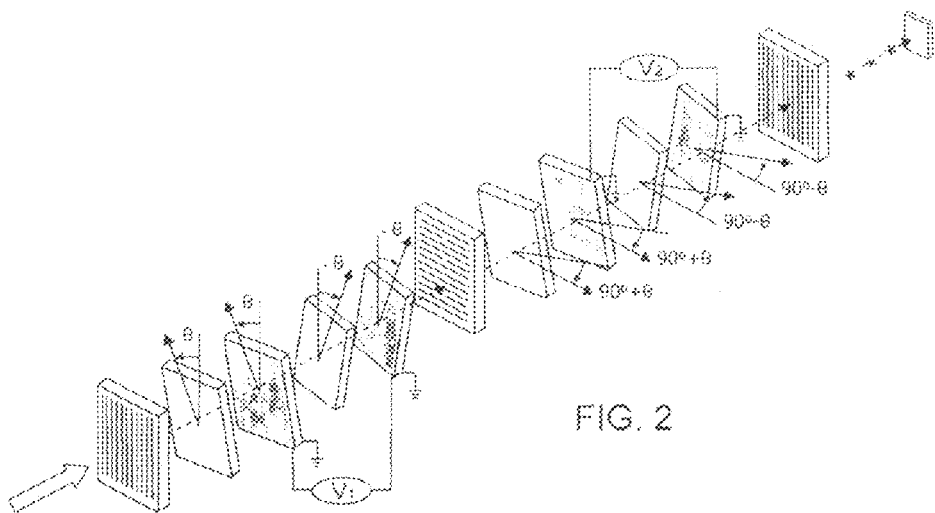
FIG. 2 is a schematic illustration of a multi-conjugate filter including tenably controllable liquid crystal retarder portions.

FIG. 2 shows an embodiment comparable to FIG. 1, except that certain of the retarders in the stages are now electrically tunable. The stages in FIG. 2 comprise at least one electrically adjustable birefringence element 46, 48, etc., such as a liquid crystal. In this example, each adjustable birefringence such as LC 46 is associated with another birefringence element 45, namely adjoined thereto and aligned at the same angle θ. In this way, the thickness "d" of element 45 (or the thickness "2d" in the subsequent stage) is effectively made variable by adding a controlled amount of birefringence. In this way, the bandpass wavelength is selectively tuned.

The free spectral range of a filter stage or filter element, is the wavelength span between successive periodically related wavelength peaks that are passed by the filter stage or element. Other things being equal, a greater free spectral range may be available by using a smaller retardation. The extent of retardation is determined by the birefringence of the retarder material and by its thickness. Thus as shown in the embodiment of FIG. 1, it is an aspect of the invention to use plural filter stages with different retardations, typically by using retarders of different thickness in the different stages. As shown in FIG. 2 wherein the retarders comprise an electrically adjustable LC portion, separate voltage controls V 1 and V 2 can be used for the stages and set in a controlled manner by a switching or other control device (not shown). The finesse of the filter is the ratio of FSR to FWHM, i.e., free spectral range to pass bandwidth of the passband peaks. The pass bandwidth FWHM can be made small by using a large number of retarders 45, 47 in the serial stack of retarder elements in the respective stage 33, or 35, etc. Each retarder element further discriminates for the required wavelength from the output of the preceding elements.

Figure 3:
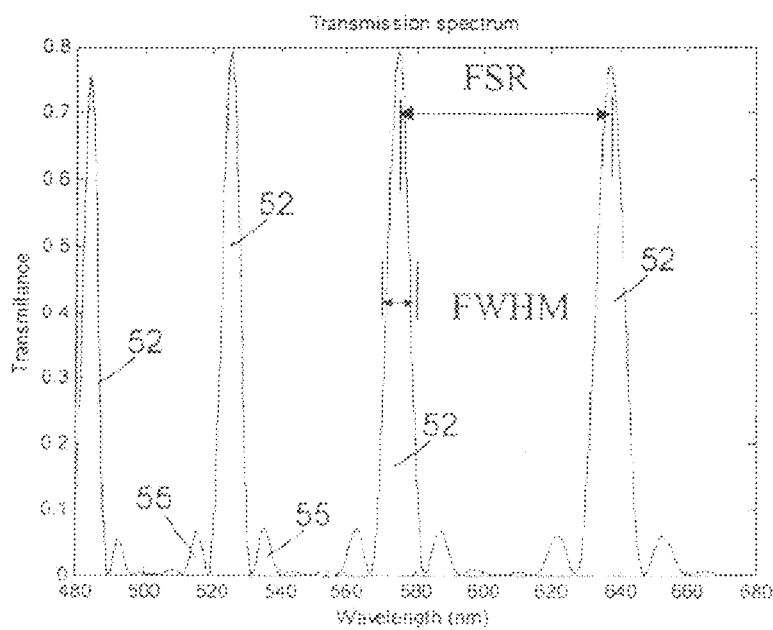
FIG. 3 is a spectral transmission plot showing the transfer function of an exemplary six element multi-conjugate filter stage.
Figure 4:
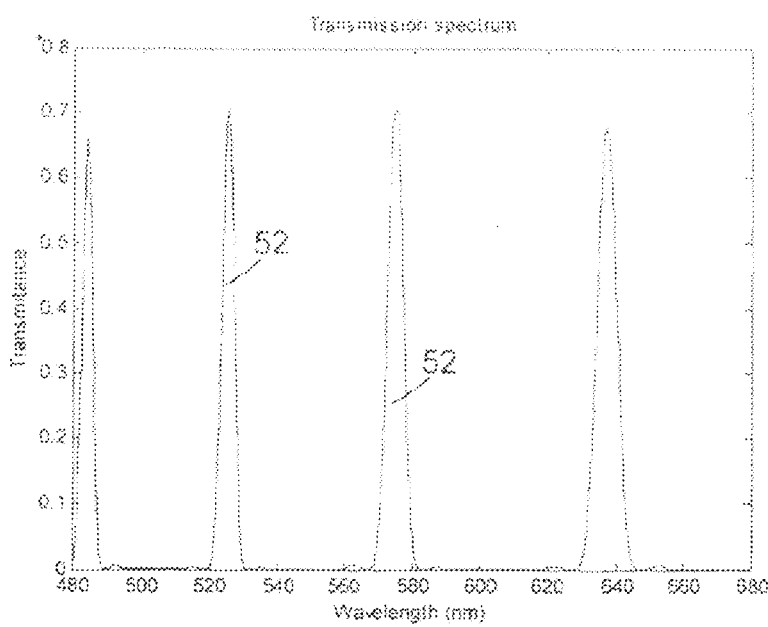
FIG. 4 is a spectral transmission plot corresponding to FIG. 3, wherein two similar six element multi-conjugate stages are arranged serially along a light transmission path, thereby reducing side lobes.

FIGS. 3 and 4 illustrate that it is also possible to improve the discrimination of a filter by stacking filter stages in which the transmission functions at least partly overlap. FIG. 3 shows the spectrum of a given filter, characterized by bandpass peaks 52 separated by a given FSR and having a given FWHM bandwidth between peaks. If one simply multiplies that filter transmission function by itself, namely by serially placing two such filters along the light signal path, the result as shown in FIG. 4 has a narrower FWHM and can benefit from removal of undesirable aspects such as side lobes 55 in the transmission function shown in FIG. 3.

Generally speaking, the FSR value of a birefringent filter is inversely related to the extent of birefringence, which in a fixed retarder is proportional to thickness. Some filters, such as Solc filter configurations are arranged for equal birefringence for each retarder element. Other filters such as Lyot and Evans may have retarders with other relationships such as integer thickness relationships. Likewise, the retarder orientation angles that cause the polarization alignment of the passband to align with the exit polarizer can vary.

According to an inventive aspect, the same such filter configuration can be used for all the stages or the configurations can be mixed and combined. However, by configuration or design parameters related to retarder birefringence, thickness, orientation or the like, the invention uses serially disposed stages having at least one overlapping passband, and preferably wherein the FSR and FWHM values of the stages are distinctly different.

Figure 5:
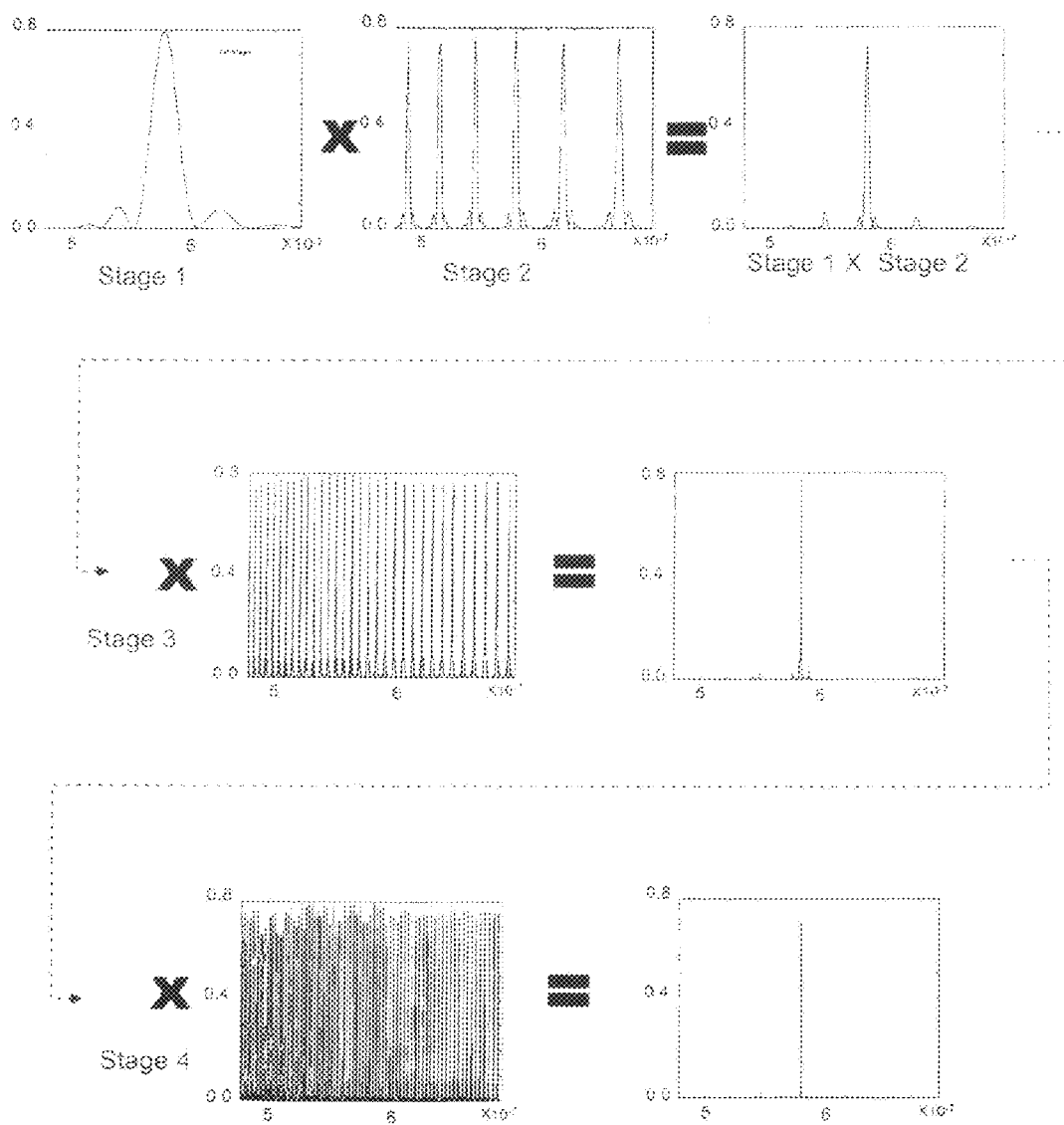
FIG. 5 is a schematic illustration showing how serially arranged filters having distinct transmission characteristics are serially arranged to provide high finesse.

This aspect is shown in FIG. 5, which shows the result of placing a set of different filter stages along a light transmission path, so that the transfer functions multiply, and wherein there is at least one overlapping passband. The succession in FIG. 5 proceeds from higher to lower FSR and greater to lesser FWHM. However this is for illustration purposes and the order of the filter stages has no effect. Provided that all the stages are provided, the stages that have relatively wider passbands supplement the stages having relatively narrow FWHM bandwidths. If Stage 1 has a high FSR and poor (wide) FWHM, then application of Stage 2 narrows the bandwidth from Stage 1. (Alternatively, one could say that the passband in Stage 1 selects one of the passbands in Stage 2 to improve the poor FSR of Stage 2.)

The succession of filter stages can be tuned to cause the stages to assume different FSR-FWHM transmission functions with an overlapping passband, and also to selectively tune to different passbands. By slightly varying the retardation, the transmission functions as shown can be varied to move the center wavelengths of the peaks within a certain span. Empirically from testing or by trial and error or by feedback controls, it is possible to tune the succession of filters to a desired passband. This enables the filter to be set to a desired imaging wavelength.

One technique for providing tunable retarders is to employ tunable liquid crystal cells as the source of at least part and potentially all of the birefringence in the respective stages. A liquid crystal cell is shown schematically in FIG. 6, and in this embodiment is directly adjoined to a fixed retarder plate. In FIG. 6, a silica plate 62 is spaced mechanically from a fixed retarder 72 by a spacer 66 and sandwiches a liquid crystal layer 64. Indium tin oxide (ITO) conductive layers 82 allow application of a control voltage $V_{CTL}$. Alignment layers 83 determine the orientation of the liquid crystal director and thus the orientation of the fast and slow axes. The extent of retardation is determined by the controllable birefringence of the liquid crystal in addition to the retardation from the fixed retarder. As shown in FIG. 2, the controllable birefringence and the fixed birefringence are arranged at the same rotational orientation in the filter stage so that the two function as a composite retarder plate (such as 45 or 47 in FIG. 1) but have a retardation value that is tunable.

Referring to FIG. 6, a mechanical spacer 66 defines a gap between plates 62, 72 for the liquid crystal material. The ITO transparent conductive layer is coupled to apply a control voltage. The alignment layer 83 determines the resting alignment of the typically elongated liquid crystal molecules. Various alignment layers are possible, for example of $SiO_x$, that can be brushed or treated by ion bombardment or the like to establish the director orientation of the crystal. Applying a control voltage alters the birefringence of the liquid crystal. As a practical matter, increasing the birefringence produces an added phase delay between light component vectors aligned to the normal and extraordinary axes, the latter axis being the one affected by the applied control voltage.

Liquid crystals comprise certain chemical compounds that exhibit one or more liquid crystalline phases in which the molecules of the compounds are movably aligned. The material is birefringent when the molecules are aligned and the extent of alignment is variable to alter the birefringence.

In a preferred configuration, the liquid crystal cell used for the multi-conjugate filter of the invention is an electrically controlled birefringence (ECB) liquid crystal cell with parallel rubbing on the top and bottom substrate to establish the orientation of the molecules. Other liquid crystal modes also can be used, such as a vertically aligned nematic liquid crystal cell, a pi-cell, OCB cell or a bend cell. In another configuration, two of the above liquid crystal cells can be double stacked with each other to achieve better viewing angle characteristics. It is possible to employ a lithium niobate ($LiNO_3$) material for the fixed retarder. However preferably, the retarders comprise bromium borate (BBO), so as to be approximately index matched to glass and/or used as a supporting plate of the liquid crystal structure as shown in FIG. 6.

The fast and slow axes of the liquid crystal 64 are aligned respectively to the fast and slow axes of the fixed retarder 72. Thus the liquid crystal contributes a controllable additional retardation between the same orthogonal vector polarization components that traverse the fixed retarder 72.

According to an aspect of the invention and as shown in FIG. 6, the liquid crystal 64 and the fixed retarder 72 preferably are substantially optically matched. For this purpose the fixed retarder advantageously comprises bromium borate. This material has an optical index of about 1.5 to 1.7 in the visible wavelength range, which is similar to the index of glass. By using a retarder with an optical index similar to glass, it is possible to omit an anti-reflective coating while reducing reflections at an interface between the retarder and a glass plate. If the optical index is mismatched at such an interface, multiple reflections can occur and detract from the transmission ratio. Other birefringence materials such as $LiNO_3$ have a higher index (e.g., 2.0 or 2.1) and are applicable to the invention but should be used with an anti-reflective coating or the like. Other birefringence materials such as calcite crystals may be applicable and may be more closely matched to glass than $LiNO_3$ may also be applicable but are not preferred due to their manufacturing challenges. Whereas birefringent materials have a different optical index along different axes, the index is matched only approximately with abutting isotropic materials such as glass. An approximate index match reduces reflections.

The foregoing materials and optical indices are directed to a hyperspectral filter in the visible wavelength spectrum. The invention is fully applicable to other spectra such as the near infrared or the ultraviolet, which are likewise useful in various chemical imaging applications. The retarders 45, 47 in the respective stages can provide different retardations by having materials with different birefringence characteristics, or by a difference in thickness along the optical signal path using single retarder elements or thin elements that are aligned and abutted to form thicker ones, or by a tunably added birefringence, or by any combination of these different characteristics. Preferably, the retarders in at least one of the stages comprise a liquid crystal tunable birefringence element. It is possible that the retarders in one or more of the stages can consist of liquid crystal elements, i.e., to employ only liquid crystal for introducing birefringence and thus to lack a fixed retarder. Preferably, one or more stages include retarders that employ both fixed retarders and liquid crystals. More preferably yet, the liquid crystals in those combined fixed and liquid crystal retarders are coupled together to form liquid crystal tunable birefringence elements wherein the fixed retarders contribute some of the retardation.

Figure 8A:
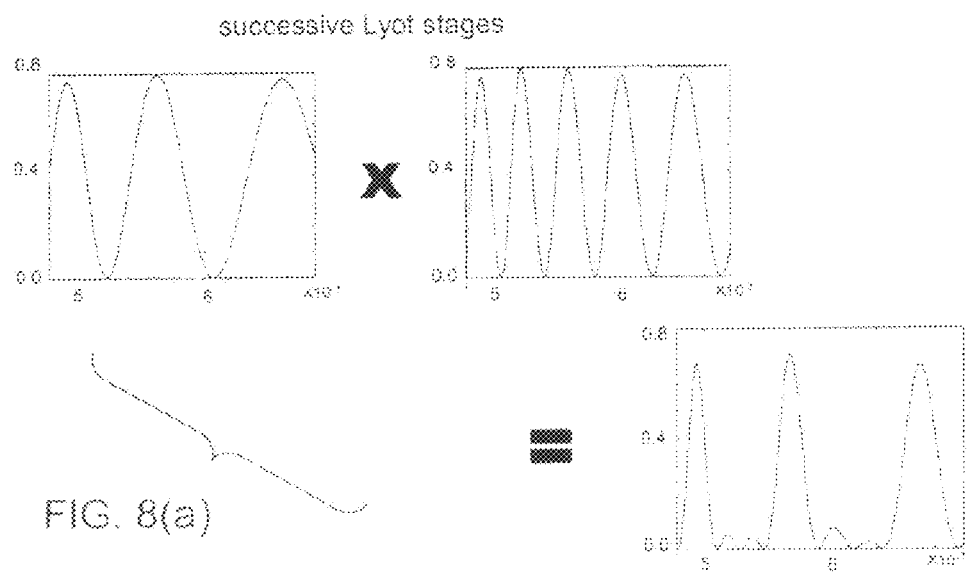
FIG. 8A is a set of transmission spectra for successive Lyot stages as in FIG. 7A, showing an effect similar to the arrangement of FIGS. 3 and 4.
Figure 8B:
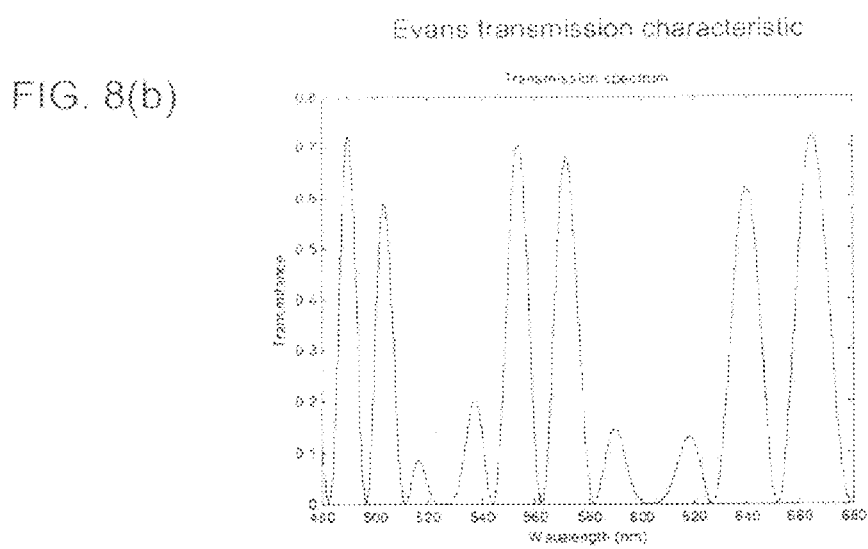
FIG. 8B shows the somewhat less regular transmission spectrum of an Evans split configuration as in FIG. 7B.

There are a number of different configurations possible according to the invention. FIG. 1 illustrates a simple schematic version. FIG. 2 shows one stage and shows that an indefinite number "n" of retarder elements can be used. If the thicknesses of the retarders are equal and the angles represent a rocking angle or progression of angles to subdivide the rotational span between the input and output polarizers, the filter stage can be regarded as a Solc configuration filter. FIGS. 7A and 7B show alternative embodiments in which one or more of the filter stages can be a Lyot or split Evans configuration. FIG. 8A shows the periodic transmission response of a Lyot stage and FIG. 8B shows the somewhat less regular response of an Evans stage. In any case, and as shown in FIG. 8A, multiplying these transmission responses in serial stages improves the finesse of the filter compared to the stages, by increasing the FSR and by decreasing the FWHM passband width. This occurs because successive application of a transmission function with a sloping-sided peak tends to decrease FWHM and selective elimination of non-overlapping peaks tends to increase FSR.

In FIG. 9, two filter stages are serially arranged. In FIG. 10 three stages are provided. In FIG. 9, each retarder has at least one adjoined controllable birefringence LC element. Each retarder could consist of or could comprise one or a plurality of such elements. In FIG. 10, plural elements are used to vary thickness, namely one increment in Substage 1, two in Substage 2, etc. These and similar arrangements are useful to provide filter configurations with distinctly different FSR-FWHM attributes.

Figure 13:
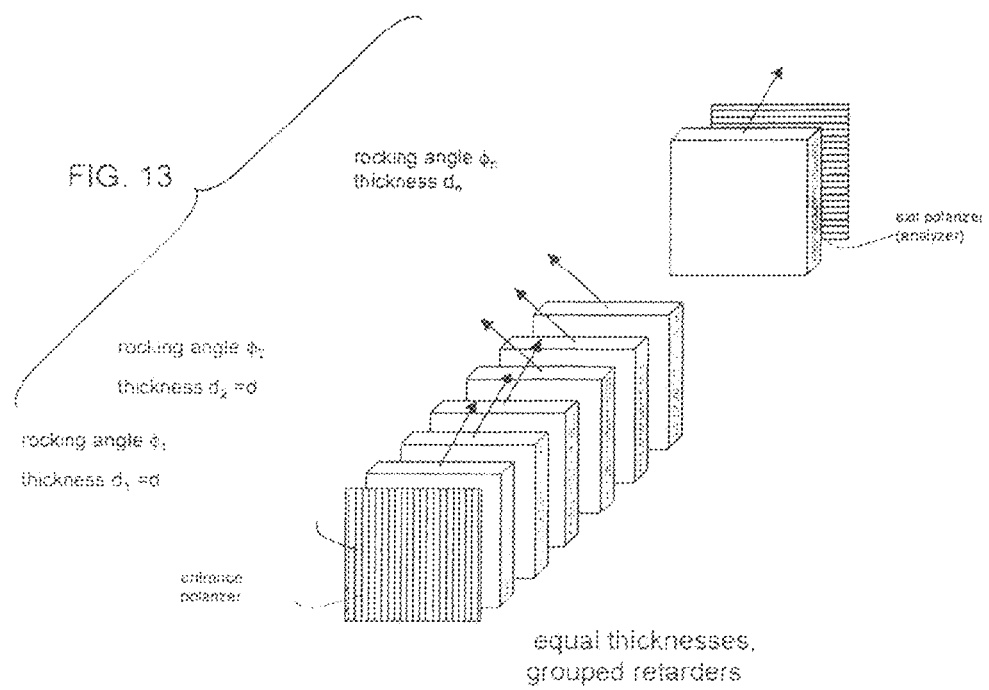
FIG. 13 is a schematic illustration showing another generalized multi-conjugate filter. stage.
Figure 14:
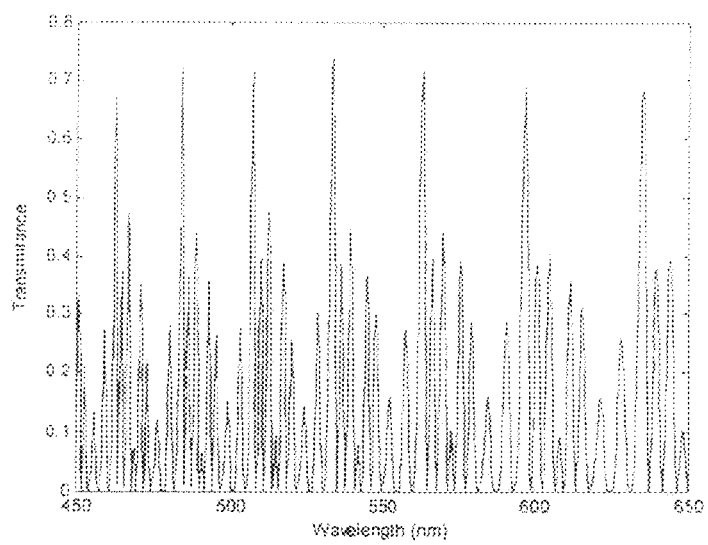
FIG. 14 is a transmission spectrum for the generalized filter stage according to FIG. 11.

FIGS. 11-13 compare some different exemplary filter configurations that are applicable to the invention. In these arrangements, the number of polarizers is limited to a number of stages, plus one, by employing arrangements wherein the oriented retarders process a light signal from a reference or input polarizer to align the bandpass wavelength(s) to the following exit or analyzer polarizer. As discussed, the exit polarizer of a stage can function as the reference polarizer for the next stage.

The generalized multi-conjugate filter stages shown in FIGS. 11-13 are preferably each tunable using the liquid crystal arrangements as discussed, namely with the retarders being either made of or including liquid crystal tunable birefringences, thus having an effect similar to varying the thickness of fixed retarders.

The filters each comprise multiple stages of which one or more and optionally all the stages are tunable by controlling liquid crystal birefringences. It is an aspect of the invention that the finesse of each filter stage can be modest but by serial concatenation of the stages, the finesse of their combination is substantial. Each stage preferably has a finesse of at least four. More preferably the stages each have a finesse of at least six. The different stages can have different finesse ratios and it is certainly possible to include stages with finesses substantially better than the prescribed four or six. The finesse of the overall filter is desirably at least 600, rendering the filter suitable for Raman and other chemical imaging.

The free spectral range ratio of any two stages in the LCTF is greater than two, and preferably is greater than 3. The individual retarders in any one or more of the stages can consist of a single birefringence layer, or can comprise a fixed birefringence filter and a liquid crystal element, a multiple stack of birefringence layers with or without a fixed retarder.

FIG. 11 shows a novel rocking or back-and-forth succession of retarder orientations related to varying retarder thicknesses. FIG. 12 shows a progression or fan arrangement in which each retarder is advanced by some rotation angle from the previous one. FIG. 13 shows a succession of equal thickness retarders, which is typical of a Solc stage configuration. FIG. 13 also shows, however, that adjacent retarders can have the same orientation and thus serve to define retarding elements of a thickness equal to a number of stacked, equally oriented plates.

According to one embodiment, the filter stage as in FIG. 13 can be a Solc stage configuration, which is generally useful in that the retarder plates are of equal thickness and no polarizers are needed except at the entrance and exit to a stage. The orientation of the retarders can be according to any of the known arrangements used for birefringence interference filters, including (at least) Solc fanout, Solc folded, Solc Gaussian, Solc linear, Solc Sinc configuration, and the like. A Solc folded configuration is relatively easy to manufacture, low in cost and generally can achieve a tight FWHM bandpass width.

A Solc filter embodied as in FIG. 6 can include a fixed retarder. The material used for the fixed retarder may be quartz, BBO, α-BBO, or other material which has a refractive index close to glass. No antireflective coating is thus required between elements. Each fixed retarder is followed by a liquid crystal birefringence element with maximum retardation smaller than 5 um.

Tuning of the filter stages is possible to cover all or substantially all of the full spectral range needed for imaging. This does not require a tuning span sufficient to shifting a given peak over the full spectral range. Instead, stages that have either large FSR or small FWHM values can be tuned simply to shift the wavelength positions of a set of periodically repetitive peaks, so as to produce a control setting where the bandpass peaks of the stages include an overlapping peak at the center wavelength desired. This usually involves tuning over only a small fraction of the spectral range for stages with low FSR values.

By serially applying two, three, or more stages with transmission peaks having sloping peak shapes, the spectral bandwidth of the selected peak is made even narrower and out of band rejection is improved. By employing multi-stage filters in which the filter comprises retarders built up from two or more potentially thin liquid crystal controllable birefringence elements, or by such elements plus fixed retarders that optionally are also stacked, it is readily and inexpensively possible to provide stages that have different basic retardation values. If the Solc configuration if selected, characterized by equal retardances within a stage, the retardances of successive additional stages can be made up by adjoining two, three or more basic retarder thicknesses to produce double, triple, or other multiple basic retardance thicknesses. A low birefringence or low dispersion liquid crystal material helps to achieve large spectral range in an LCTF. However, large FSR usually sacrifices bandwidth (i.e., results in a large FWHM value). Combining large FSR stages with small FWHM stages results in the advantages of both.

Referring again to the generalized configuration in FIG. 11, in this embodiment the thickness of the retarders (preferably including tunable birefringent elements) is not equal. However, the rocking angle and the thickness of the retarder follow a particular relationship. Assuming that the rocking angle and the thickness of the $k^{th}$ retarder element is $\phi_k$ and $d_k$, The rocking angle and the thickness of the $k+1^{th}$ retarder element is $\phi_{k+1}$ and $d_{k+1}$, where k=1, 3, 5, 7, 9, 11 . . . .

The generalized multi-conjugate filter stage could have the rocking angle and thickness of:

$\phi_k = m\phi, \phi_{K+1} = n\phi$ $d_k = md, d_{k+1} = nd$ where m=1, 2, 3, 4 □ □ . . . n=1, 2, 3, 4 □ □ . . .
0.7□°<φ<11.25 □°0.5 □ □ μm<d<5000 □ □ μm.

An example of this arrangement is represented by the following table.

Retarder Number Rocking Angle Thickness "d" of the retarder

| | | |
|---|---|---|
| 1 | 7.5° | 1000 μm |
| 2 | −22.5° | 3000 μm |
| 3 | 7.5° | 1000 μm |
| 4 | −22.5° | 3000 μm |
| 5 | 7.5° | 1000 μm |
| 6 | −22.5° | 3000 μm |

Figure 15:
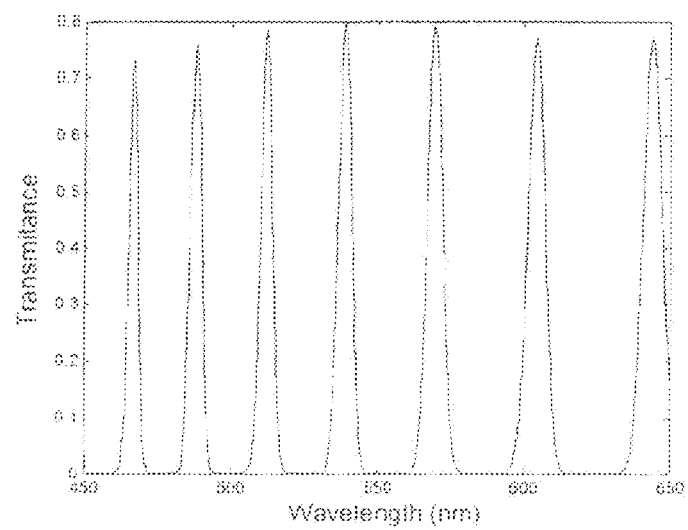
FIG. 15 is a transmission spectrum for a further generalized filter stage.

The generalized embodiment of FIG. 12 is such that the thickness of the birefringent retarders is the same. The thickness of the $k^{th}$ retarder element is "d" and the rocking angle of the $k^{th}$ retarder element is $\phi_k$. The rocking angle can progress according to a Gaussian function, a triangular function, a sinusoidal function, sinc square function, etc. Characteristic rocking angle progressions that can be employed are disclosed in Salman Saeed, Philip J. Bos, "Multispectrum, spatially addressable polarization interference filter," JOSA A, Volume 19, Issue 11, 2301-2312, which is hereby incorporated for such teachings. An example of a suitable progression is shown in the following table and its transmission spectrum is shown in FIG. 15.

Retarder No. Rocking Angle φ Thickness "d"

| | | |
|---|---|---|
| 1 | 0.47° | 1000 μm |
| 2 | 3.1° | 1000 μm |
| 3 | 12.5° | 1000 μm |
| 4 | 32.3° | 1000 μm |
| 5 | 57.7° | 1000 μm |
| 6 | 77.5° | 1000 μm |
| 7 | 86.9° | 1000 μm |
| 8 | 89.53° | 1000 μm |

In another generalized arrangement wherein the thickness of retarder element is always "d," the rocking angle of the $k^{th}$ retarder element $\phi_k$ can proceed as in the optimized computer simulation described in Gal Shabtay, Eran Eidinger, Zeev Zalevsky, et al. "Tunable birefringent filters-optimal iterative design," Appl. Opt., Vol. 36, No. 1, 1997, pp 291, also hereby incorporated for that progression.

The embodiment of FIG. 13 has equal retarder thicknesses, although in this example the retarders are shown as stacks of plural elements. The thickness of each retarder is "d." The rocking angle of the $k^{th}$ retarder element is $\phi_k$. The number of repeating retarders of the same thickness and rocking angle is "M." Therefore, $\phi_k = (-1) \mod(k,M)\phi$ $d_k = d$ $\phi = M*180°/(4k)$ Here mod(k,M) is the modular function In the described embodiments wherein the cooperating retarders include one or more stages having retarder elements that are wholly or partly fixed retarders abutted with controllable liquid crystals, use of an index matched fixed retarder material such as bromium borate maintains the high transmission ratio obtained in general by use of stacked configured filter stages using as few polarizers as practicable. This is accomplished in part by reducing reflections at discontinuities in the optical indices proceeding along the optical path. Other retarder materials are also possible and unless index matched can be provided with antireflection coatings. Possible fixed materials include, for example: Barium Borate (BBO, α-BBO) ($n_e$=1.5534, $n_o$=1.6776); Quartz; Calcite; Yttrium Vanadate ($YVO_4$); $LiNO_3$; $MgF_2$; Potassium Niobate Crystal ($KNbO_3$); etc.

Although generally applicable for high resolution wavelength discrimination, a preferred application for the inventive filter is as a tunable spectral filter for SWIR imaging. Each of the filter stages can comprise plural equally retardant rotationally distributed retarders leading into an output polarizer, wherein the output polarizer for leading stages functions as an input polarizer for a following stage.

The transmission loss from a polarizer is a function of the polarizer material, optical signal wavelength and similar factors. In the visible spectrum, a typical polarizer might have an exemplary transmission ratio of about 88% (i.e., a 12% loss) for light that polarized in alignment with the polarizer. Under that assumption, a filter stage with an input polarizer and an output polarizer has a 77% transmission ratio due only to polarizer related losses. If each additional stage adds just one polarizer, three polarizers (two stages) allows a 68% transmission ratio, three stages 59%, four stages 52%, five stages 46%, six stages 40% and so on, attributable to polarizers. The finesse of the stages is multiplied as already described; and if each stage has the modest finesse ratio of about three, with six stacked stages one can exceed the necessary finesse of 600 with a transmission ratio of about 40%.

The operational wavelength region of the filter may dictate the material of the polarizer used in the filter, because polarizers generally are useful over a limited optimal wavelength range. The fixed retarder and the liquid crystal material generally have high transmission in a very wide range of wavelength spectrum. However, the transmission spectrum of the polarizer may be limited, e.g., to the UV, VIS, NIR, SWIR or MWIR region. For the multi-conjugate filter of the invention, by selecting different types of polarizers, the filter can operate in the corresponding UV, VIS, NIR, SWIR or MWIR wavelength region. An exemplary VIS polarizer can be NITTO DENKO's NPF series of polarizing film. Edmund Optics carries high contrast UV and NIR polarizers that can cover 365 nm to about 1700 nm. ColorPol series UV to NW polarizers from CODIXX can cover the 350 to 2500 nm wavelength region. These elements are advantageous for many hyperspectral imaging applications that require collection of optical signal in a wide wavelength spectra.

A following set of tables illustrates some specific embodiments of the multi-conjugate filter of the invention. By way of an explanation of the acronyms, these embodiments illustrate multi-conjugate filters (MCF) comprising multi-stage liquid crystal tunable filters (LCTF) in exemplary Solc or similar configurations wherein a rotational displacement angle between two polarizers along the optical signal path is distributed among a set of equally birefringent retarder elements. Thus, the polarization alignment of a predetermined bandpass wavelength (which can be tunably selected), is aligned by passing each of the birefringent elements to the extent required to align to a second or exit polarizer. Other wavelengths are blocked.

In certain embodiments, each LCTF has a liquid crystal birefringence element, a fixed retardation plate and a polarizer. In other embodiments (or stages within a given embodiment), the retardation is supplied by liquid crystal tunable elements only. In the LCTF embodiments, the liquid crystals can be stacked.

The retardation provided by some of the stages is distinctly greater than other stages, typically by employing fixed or variable retarders in some stages that are distinctly thicker than the retarders of other stages. This produces a distinct variation in the allocation of bandpass width and free spectral range, i.e., some stages having spectra characterized by relatively widely spaced relatively wide bandpass peaks, and other stages having just the opposite allocation, namely relatively closed spaced relatively narrow bandpass peaks. Additionally, some of the stages can reinforce one another, for example by applying plural stages with similar bandpass spectral peaks that are generally of a triangular shape over a range of wavelengths, so as to improve out of band rejection.

In keeping with the invention, each stage of the multistage conjugate filter preferably has a finesse ratio greater than four (i.e., FSR/FWHM>4). More preferably, the finesse is greater than six. Also preferably, the ratio of the free spectral ranges of any two stages in the filter is greater than two, and more preferably greater than 3. That is, the ratio $FSR_1/FSR_2$>2.0 to 3). For a given retarder material, the FSR varies as a function of retardation or birefringence and thickness. Thus, generally the ratio of free spectral ranges produces a distinct difference in the thickness of the retarder plates in the Solc filter structures of at least two of the stages.

According to an aspect of the invention, tuning the filter to encompass a full operative spectral range does not require shifting the peak of each independent stage across the full spectral range. The periodically repetitive peaks are tunable sufficiently to provide a series of tunably selectable wavelengths across the spectral range, at which the bandpass peaks align and thus gate the same tunably selected wavelengths through the succession of filter stage peaks. Typically, any particular periodic peak needs to be tunably movable over only a small fraction of the spectral range of the multiconjugate filter. The ability to selectively align different peaks from the periodic patterns of repetitive peaks of each of the stages (each peak of which may be tunable over only a modest free spectral range), enables a suitably configured control to set the stages to tuning states wherein ones of the periodic peaks of a given stage are selectively aligned with other peaks when tuning to a desired bandpass wavelength.

A plurality of LCTF tunable stages can be employed in this way to achieve a high out-of-band rejection ratio and narrow spectral bandwidth around the tuned bandpass wavelength. The multi-stage can use tunable and fixed retarder stages, but also can achieve differences in retardation from one stage to the next by using stacked liquid crystals with multiple abutted elements (or a larger number of multiple abutted elements) for the stages that need a greater thickness to achieve greater retardation than other stages.

The invention can use tunable LCTF retarder elements that comprise a relatively low birefringence or low dispersion liquid crystal material, and nevertheless achieve the desired free spectrum range (FSR) in the multiconjugate filter as a whole. Individual stages with low birefringence retarder elements can be used to exploit their larger free spectral range. There may be a resulting sacrifice of spectral discrimination (the bandwidth is wide), but by repeating stages and also by relying on the narrow spectral discrimination of other typically thicker-element stages, the conjugate filter achieves all the objectives of out of band rejection, tunability and wavelength bandwidth (FWHM) at the tuned bandpass wavelengths.

The various embodiments incorporated in this description include examples, a number of which are detailed in FIGS. 16-23. These embodiments have at least two stages, and preferably from three to six stages, each having at least two and preferably four or more retarders per stage. In another arrangement, six filter stages, each having at least four retarders are provided.

There are a number of possible arrangements wherein a given set of retarders, retarder thickness relationships and relative orientations can subdivide the rotational angle between the input and output polarizers. There are also various possibilities for how many of the elements are tunable versus fixed. Finally, any particular element can be made up of one or more tunable birefringences that are tuned in unison. Employing several relatively thinner abutted liquid crystal elements to build up a relatively thicker retarder element; results in a filter that can be tuned more quickly than a filter using thicker tuned elements.

The retarders in at least one of the stages may comprise liquid crystals that are coupled to a common tuning control. The birefringence of the retarders is caused to vary equally for all the retarders in a given one of the stages. Tuning the stage is thus functionally the same as changing the thickness of a set of equally dimensioned and equally birefringent retarders in the stage. In another example, the retarders in at least two of the stages can comprise liquid crystals coupled to a tuning control for independently varying the birefringence for the retarders in respective ones of the at least two stages. However, the retarders in a given stage are tuned equally, preferably by varying two or more abutted liquid crystal elements, or alternatively wherein at least a subset of the retarders coupled to the tuning control comprises fixed retarders coupled to tunable liquid crystals.

In one embodiment, the present disclosure provides for a spectral imaging filter having tunable wavelength pass bands in the range of near infrared ("NIR") and/or short wave infrared for use in NIR/SWIR spectroscopy and spectroscopic imaging. In one embodiment, the filter may be designed with six serial stages along an optical path with angularly distributed liquid crystal cells, birefringent retarders, and polarizers. Different filter stages may provide distinctly different periodic transmission spectra. In one embodiment, the first stage may have a greater free spectral range in the range of 850-1700 nm than the other stages. The following stages may have narrower bandpass peaks than the preceding stage. The respective spectra of every stage may include at least one tunable selectable pass band at which the transmission spectra of the filter stages coincide. The narrow and wide pass bands of different stages apply together, resulting in a high finesse wavelength filter suitable for the NIR/SWIR spectroscopy and spectroscopic imaging. The FMHM may be 8±1 nm at 1050 nm and 18±2 at 1650 nm. In one embodiment, the filter may feature high accuracy, approximately 1 nm in the temperature range of 15°-45° C. with 15-25% polarized transmission and high out-of-band rejection ratio.

In one embodiment, the present disclosure provides for a filter, the filter comprising: at least two spectral filter stages coupled along an optical signal path, wherein each of the filter stages has a periodic transmission characteristic with bandpass peaks separated by free spectral bandpass gaps. Each of the filter stages may comprise a set of birefringent elements and at least one polarizer. For one filter stage, this set of birefringent retarders may comprise a plurality of active retarders, such as tunable liquid crystal birefringenet retarders. For one or more other filter stages, this set of birefringent retarders may comprise at least one passive retarder, such as a fixed retarder, and one or more active retarders.

The birefringent retarders of one stage may be characterized by a retardation that is different from a retardation of the birefringent retarders in at least one other of the stages. As a result, one stage may have a greater free spectral range than one or more other stages, between the bandpass peaks of the stages. At least one stage may have narrower bandpass peaks than at least one other stage.

The bandpass peaks of the filter stages may overlap in an operative state of the filter, whereby a transmission characteristic of the spectral imaging filter as a whole is characterized by the greater free spectral range and said narrower bandpass peaks.

The set of birefringent retarders of each filter stage may be rotationally distributed leading to an output polarizer, whereby the output polarizer for leading stages functions as an input polarizer for following stages. Additionally, a number of the stages, and a number and respective thickness of retarders within the stages, may be chosen to provide a free spectral range (FSR) from about 850-1700 nm.

In one embodiment, the individual stages of the filter may comprise at least one of a tunable liquid crystal birefringence element (an active retarder), a fixed retarder (a passive retarder), a polarizer, and combinations thereof. The first stage of a filter of the present disclosure may comprise only active retarders. These retarders may comprise eight tunable liquid crystal birefringent elements in a Solc configuration. These active retarders may be configured in a way that the optical axis is rotated from 7°, 29°, 61°, and 83°. The remaining stages of the filter, for example stages two through six, may feature a similar angle configuration of optical axis of each individual element but a different thickness of the passive retarder.

In one embodiment, the fixed retarder may comprise a material such as quartz, BBO, α-BBO, or another material that has the same performance. Each active retarder may be paired with a passive retarder. The six stages of the filter provided for herein may be used to achieve a high out-of-band ratio with minimum of 300:1. In one embodiment, the filter holds potential for providing a polarized transmission of approximately 1-25% and a fast switching speed of approximately 50-100 ms response time. There may be a nominal FWHM of 8±1 nm at 1050 nm and 18±2 at 1650 nm.

Figure 19C:
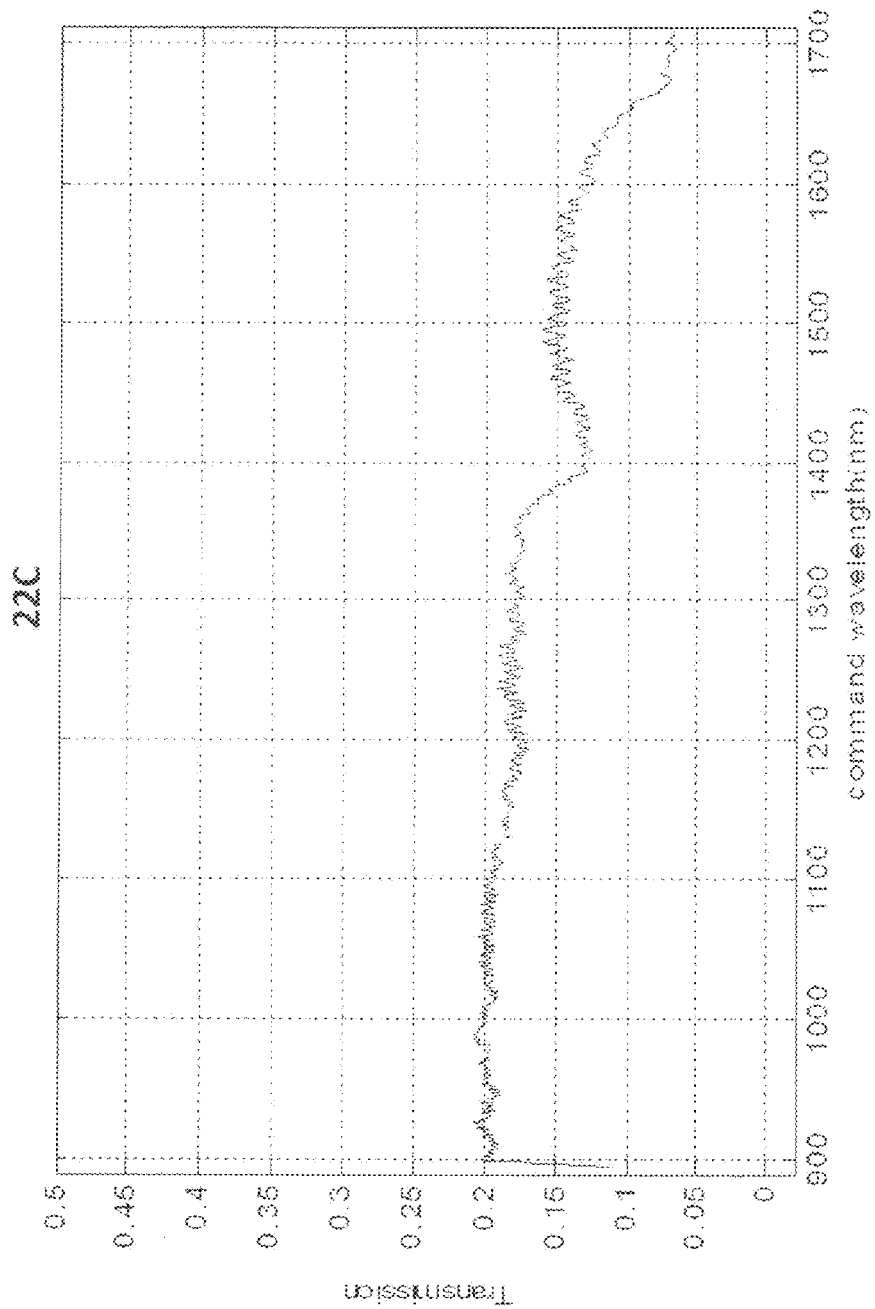
FIG. 19C is illustrative of transmission output of a filter of the present disclosure.
Figure 19D:
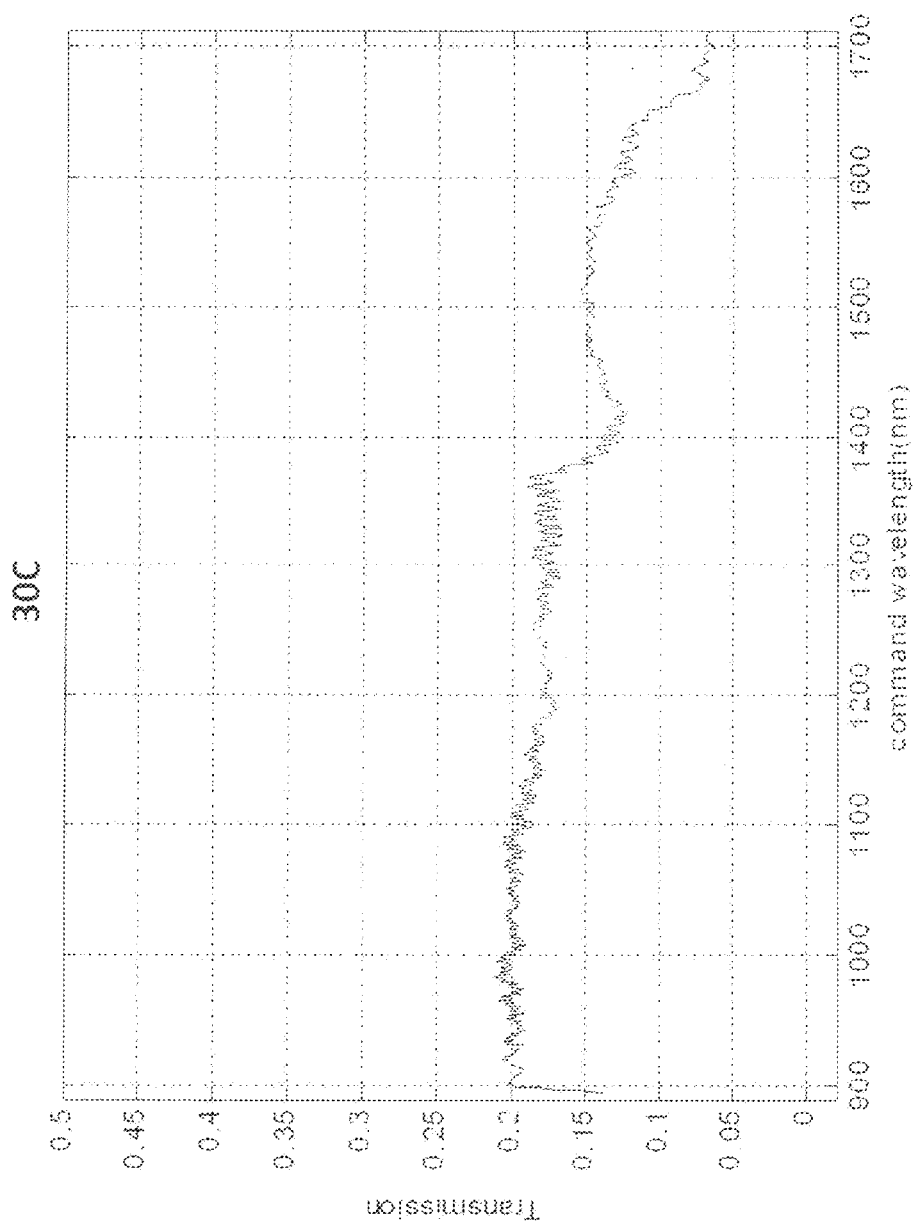
FIGS. 19A-19B are representative spectra at 1050 nm and 1450 nm, respectively.
Figure 19E:
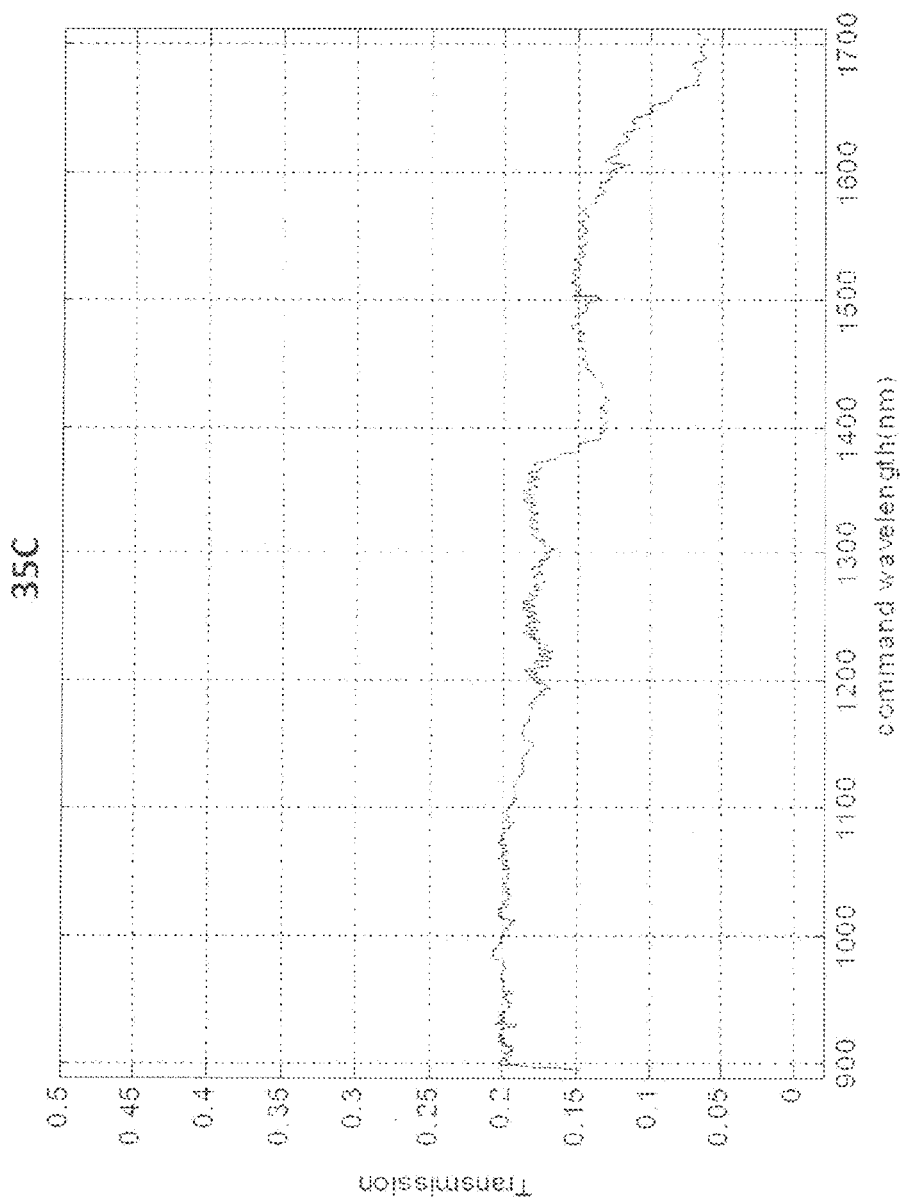
Figure 19F:
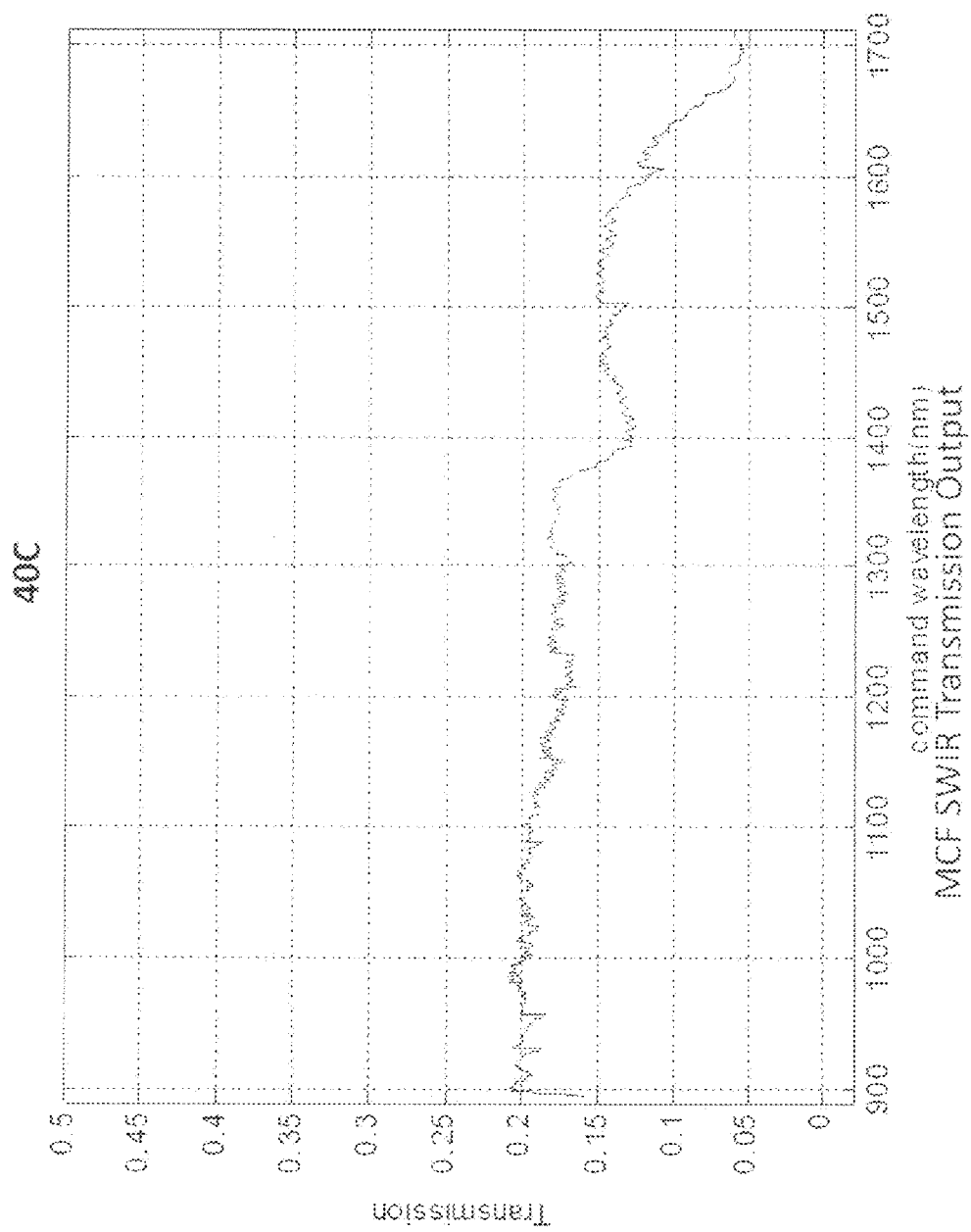

FIG. 16 is illustrative of an embodiment of the present disclosure. In FIG. 16, 20 micron tunable liquid crystal birefringence elements are implemented. Such an embodiment holds potential for providing switching speeds of approximately 114 ms. FIGS. 17A-17B are illustrative of specifications enabled by the filter embodiment. FIGS. 18A-18C provide data for the design, channels 1-12. FIG. 19A is representative of spectra at a wavelength of 1050 nm and FIG. 19B is representative of spectra at a wavelength of 1450 nm. FIG. 19C is illustrative of exemplary transmission outputs of a filter embodiment of the present disclosure.

The present disclosure also provides for another embodiment of the filter of the present disclosure. In such an embodiment, several of the filter elements are altered to provide for an increase in the angle of acceptance and response time. Several factors may relate to response time, which can be represented by:

$$\tau_{rise} = \frac{r_1 d^2}{K\pi^2 \left[\left(\frac{V}{V_{th}}\right)^2 - 1\right]}$$

$$\tau_{decay} = \frac{r_1 d^2}{K\pi^2 \left[\left(\frac{V_b}{V_{th}}\right)^2 - 1\right]}$$

$d$: cell gap $r_1$: rotation viscosity $K$: elastic constant $V_{th}$: threshold voltage $V_b$: bias voltage V: applied voltage Possible ways to improve response time may include: increasing temperature and decreasing rotation viscosity; decreasing liquid crystal cell thickness; choice of material (different liquid crystals have different viscosity, birefringence, elastic constant, etc.); increase the applied voltage (increasing the applied voltage will also increase the response speed (overdrive)). In one embodiment, temperature may be controlled to increase tuning speed.

The filter of the present disclosure may be configured so as to compensate for changes in temperature, which may affect tuning accuracy. This may be achieved by modifying the voltages applied to the liquid crystals which depend on the temperatures so that the tuning remains highly accurate.

Such compensation may comprise determining a peak accuracy, throughput and out of band ("OOB") ratio during the manufacturing process and factory acceptance tests. In one embodiment, each stage of a filter may be measured and compensation acquired. Therefore, the calibration of the performance parameter for tuning the filter may be pre-determined. In such an embodiment, the only measurement that may need to be made is the reading of the temperature. The filter can then identify the appropriate compensation to apply based on the look-up table. In one embodiment, there may be a plurality of look-up tables, each specific to a certain temperature.

The operational temperature may be defined with a filter type and performance parameter. In one embodiment, this may comprise a temperature in the range of 15-45° C. The temperature may be measured accurately with temperature sensors close to the filter stack. A look-up table, comprising appropriate voltages for at least one of: temperature, performance parameter, filter stage, wavelength, and combinations thereof, may be consulted. In one embodiment, the look-up table used to drive the filter may be calibrated for the operational temperature range. In one embodiment, the look-up table may comprise a plurality of voltages, each voltage associated with at least one of: a stage of the filter, an operational wavelength, an operating temperature, and combinations thereof. Measuring temperature before tuning the filter may trigger the application of a correct look-up table. This may result in accurate wavelength tuning. In one embodiment, peak accuracy over FSR may be approximately ±1 nm. The temperature measurement, the resulting peak accuracy, and the look-up table may provide similar polarized transmission over the FSR within the operational temperature range.

In relation to liquid crystal cell thickness, the cell gap effect can be represented by: $\pi \propto d^2$. For example, with the same liquid crystal material, if the response time for 10 microns is 30 ms, a liquid crystal material with 20 micron thickness will be about 120 ms. Embodiments of such a filter are illustrated by FIGS. 20A-20B.

Liquid crystal cell thickness may affect response time. In addition to response time, the an embodiment of the present disclosure seeks to increase the field of view (view angle). In prior art designs, an incident beam with a different angle will see a different retardation of a liquid crystal device with a tilted angle by applying some voltage. The tilt direction is determined by the pre-tilted angle.

Various configurations may be conceived to achieve the embodiment of FIGS. 20A-20B. Exemplary configurations are illustrated in FIGS. 21A-21B.

Figure 22:
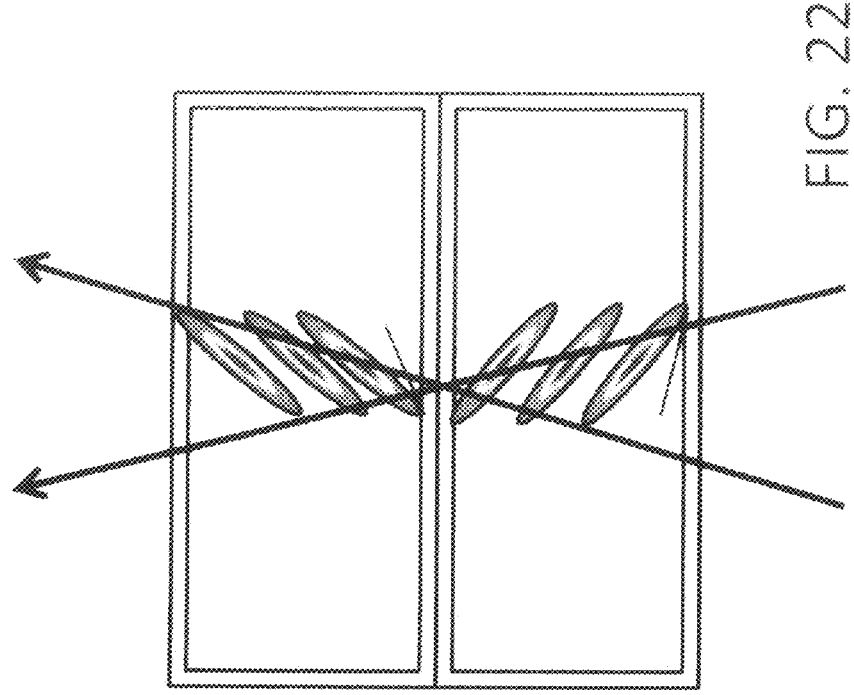
FIG. 22 is illustrative of a dual liquid crystal device which may be implemented in a filter of the present disclosure.
Figure 23A:
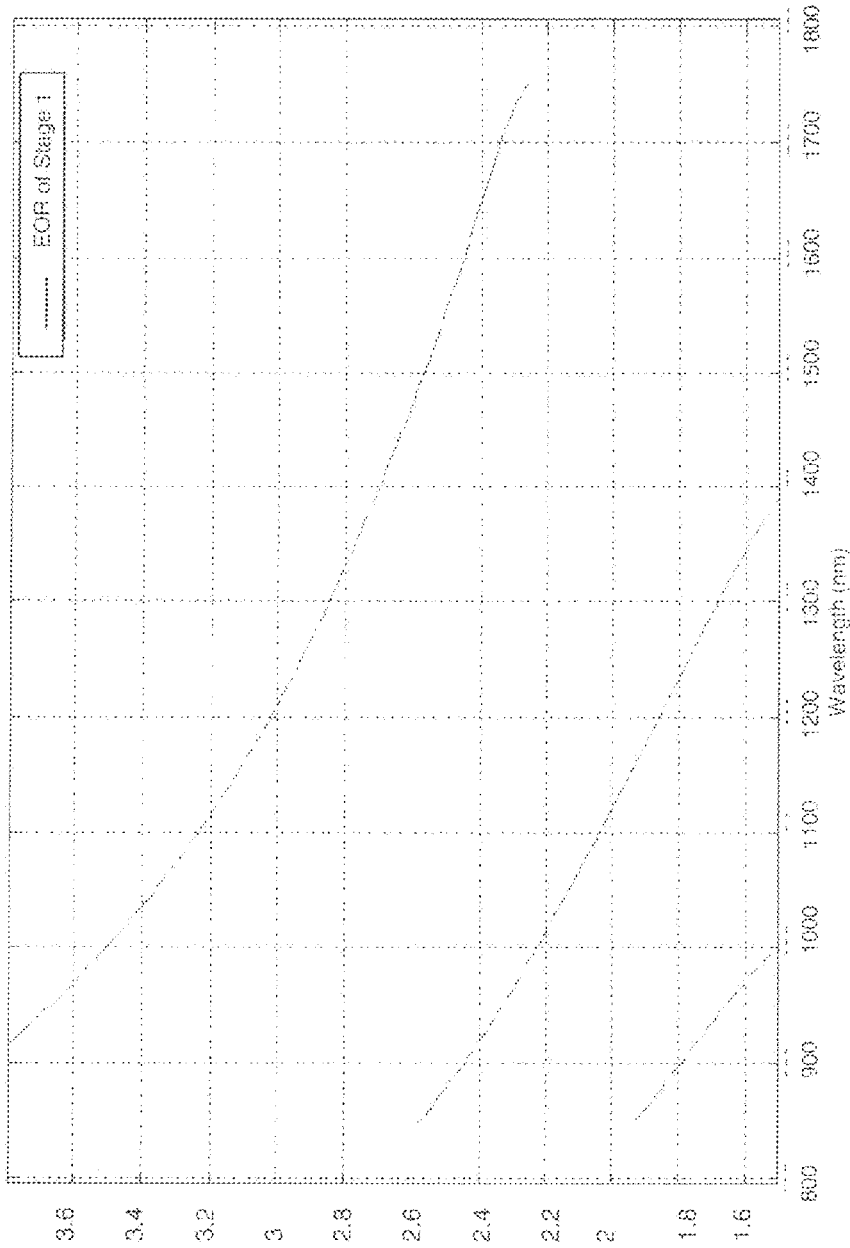
FIGS. 23A-23F are representative EOR curves of stages 1-6 of a filter of the present disclosure.
Figure 23B:
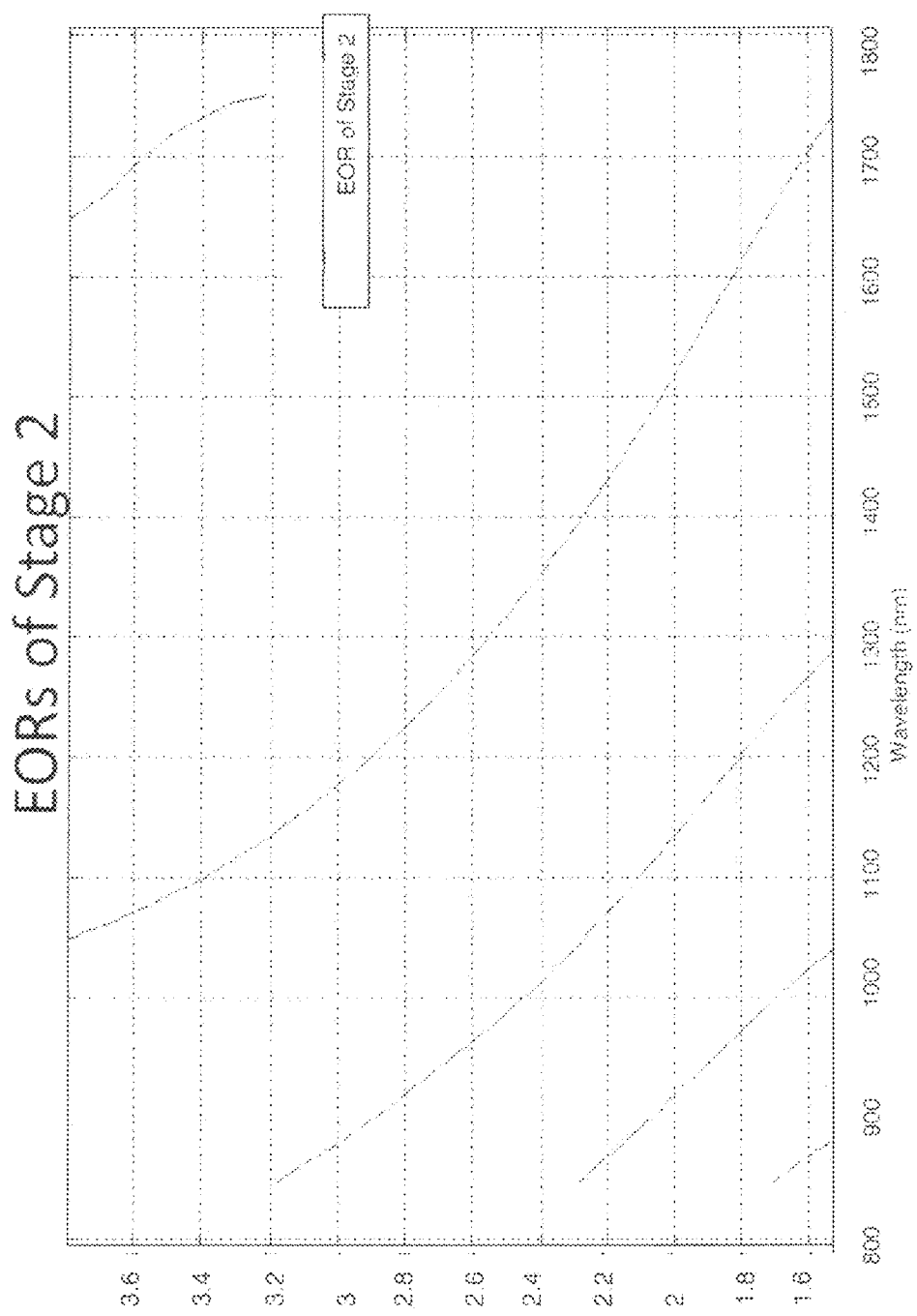
Figure 23C:
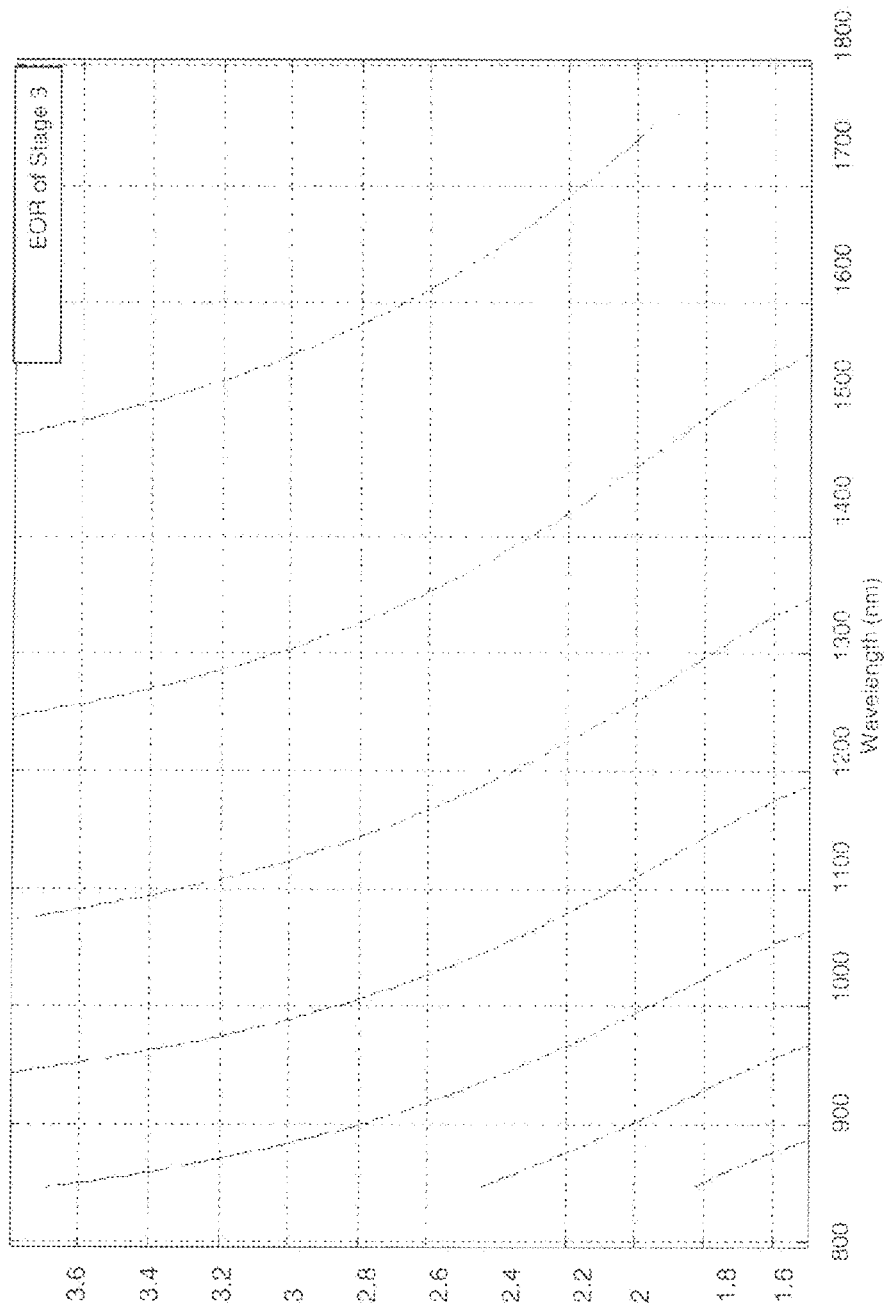
Figure 23D:
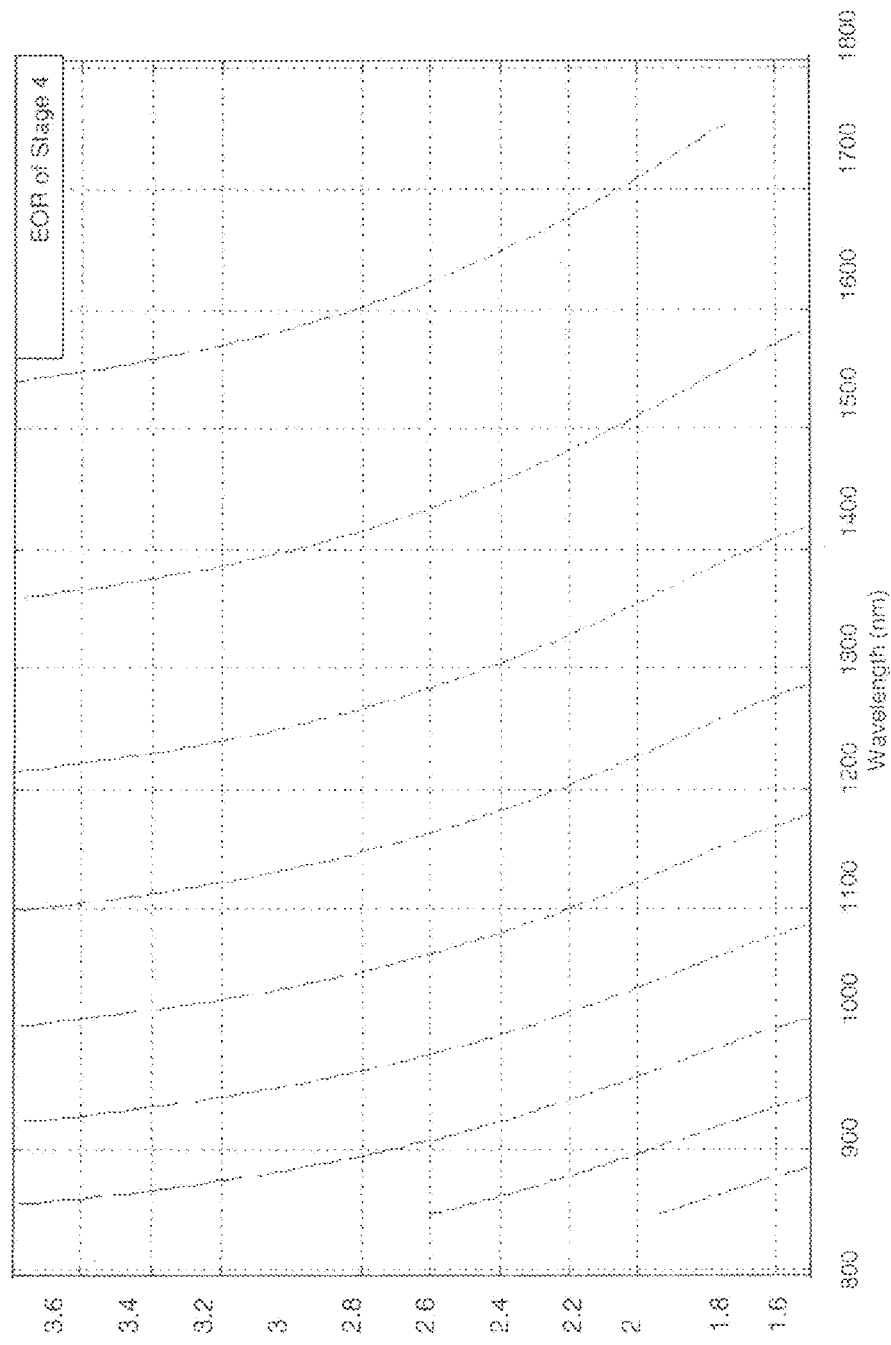
Figure 23E:
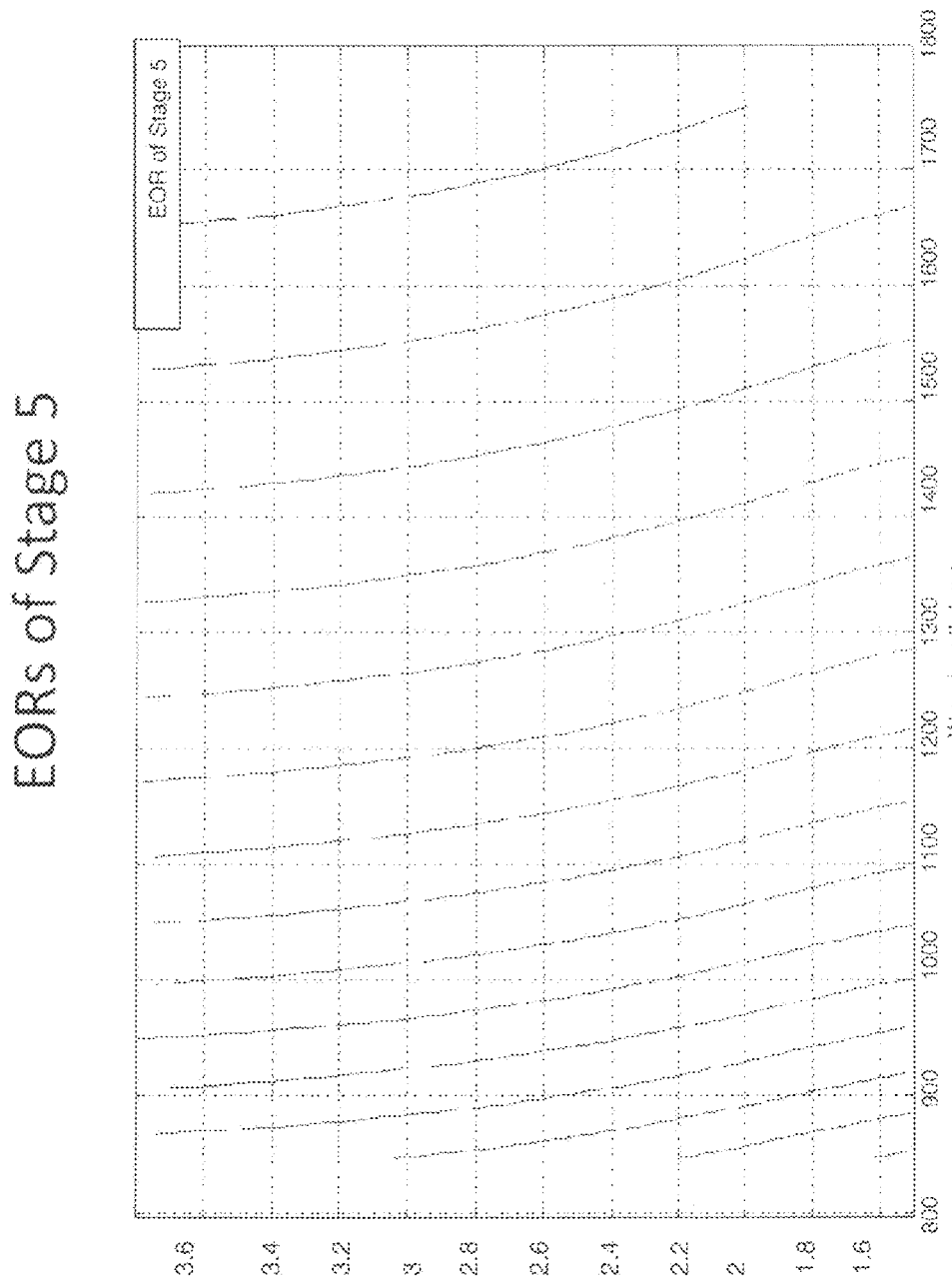
Figure 23F:
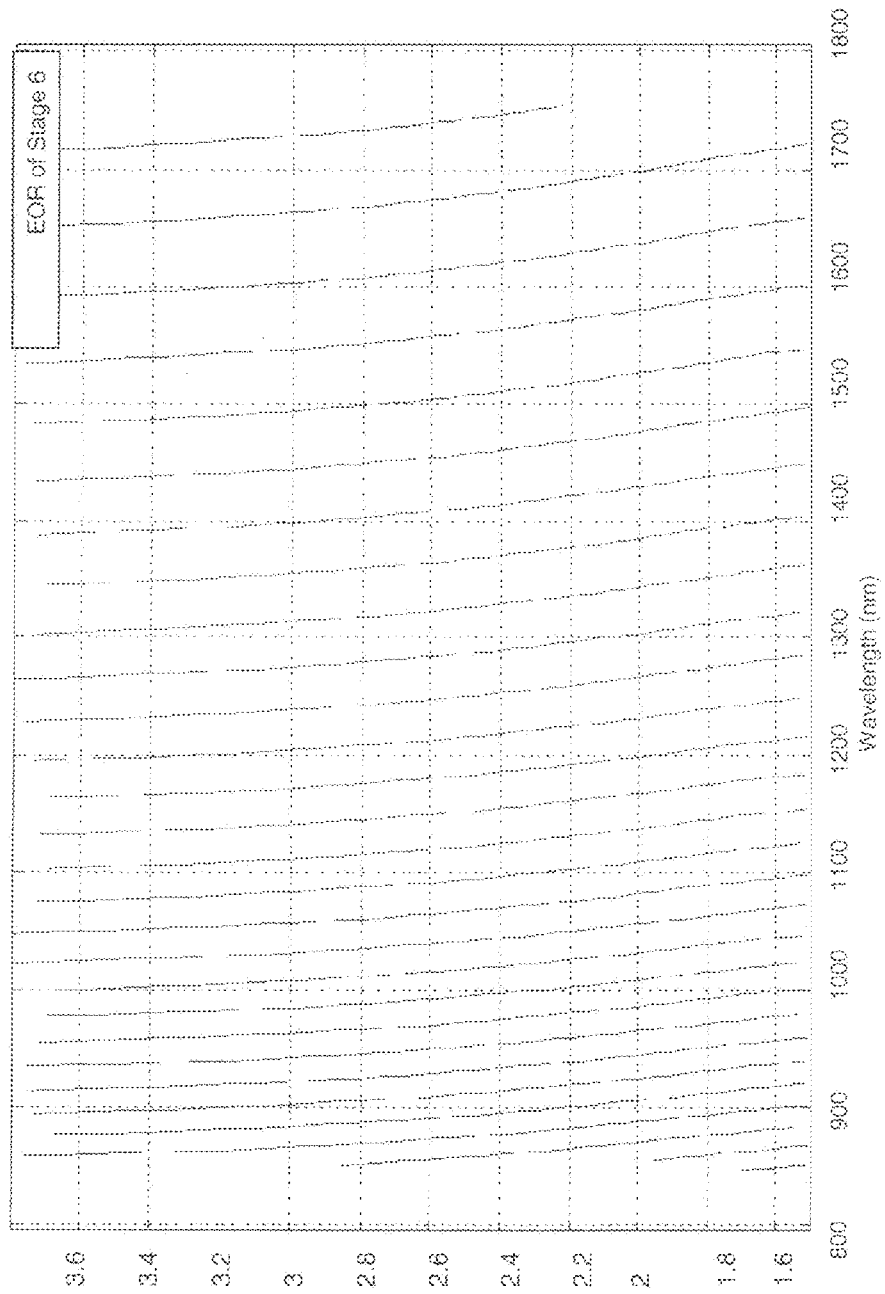

To compensate for the field of view, a dual liquid crystal device design is implemented. In such an embodiment, instead of utilizing one 20 micron liquid crystal cell, two 10 micron liquid crystal cells are used. This configuration is illustrated by FIG. 22. In the plane, The left or right incident beam will see similar retardation, two cells cancel each other, and compensate the retardation difference. In one embodiment, these two liquid crystal cells comprise one 2 and one −2 pre-tilt angle. In such an embodiment, the left or right incident beam will see similar retardation, two cells cancel each other, and compensate the retardation difference. This improves the FOV by compensating the retardation.

Figure 24:
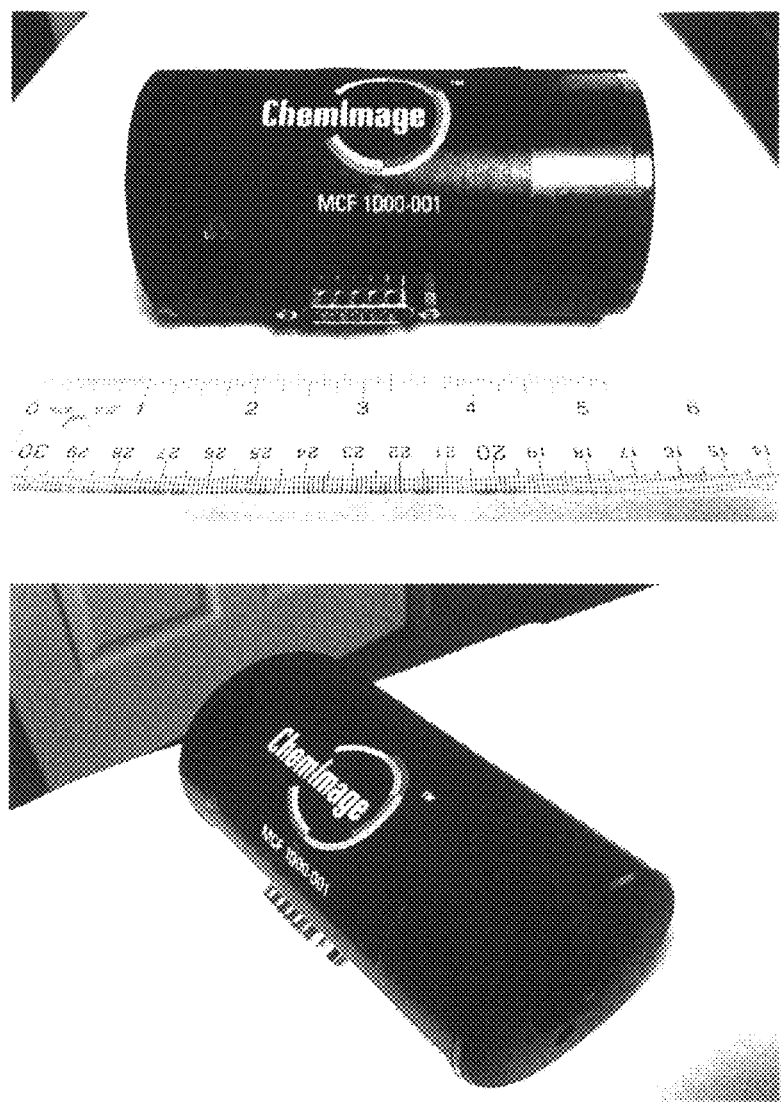
FIG. 24 is illustrative of an exemplary housing that may be utilized for the embodiments of the present disclosure.

FIGS. 23A-23F are representative of exemplary Electronic Optical Responses ("EORs") of the various stages of an embodiment of the present disclosure. The EORs illustrate how to drive the filter. These voltages may be stored in a look-up table. These figures illustrate the ability of the embodiment of the present disclosure to continuous tune the full range without any gaps. FIG. 24 is illustrative of an exemplary housing that may be utilized for the embodiments of the present disclosure.

The present disclosure may be embodied in other specific forms without departing from the spirit or essential attributes of the disclosure. Although the foregoing description is directed to the embodiments of the disclosure, it is noted that other variations and modification will be apparent to those skilled in the art, and may be made without departing from the spirit or scope of the disclosure.

What is claimed is:

1. A spectral imaging filter, comprising:
   at least two spectral filter stages coupled along an optical signal path, wherein each of the at least filter stages has a periodic transmission characteristic with bandpass peaks separated by free spectral bandpass gaps;
   wherein each of the filter stages comprises a set of birefringent retarders and at least one polarizer, and the birefringent retarders in the set of at least one of said stages is characterized by retardation that is different from a retardation of the birefringent retarders in at least one other of the stages, such that said one of the at least two filter stages has a greater free spectral range than the other of the two filter stages, between the bandpass peaks of said one of the filter stages, and said other of the two filter stages has narrower bandpass peaks than said one of the two filter stages;
   wherein the bandpass peaks of said at least two filter stages overlap in an operative state of the filter, whereby a transmission characteristic of the spectral imaging filter as a whole is characterized by said greater free spectral range and said narrower bandpass peaks; and
   wherein said set of birefringent retarders of each filter stage are rotationally distributed leading to an output polarizer, whereby the output polarizer for leading stages functions as an input polarizer for following stages, wherein a number of said stages, and a number and respective thickness of retarders within the stages, are chosen to provide a free spectral range (FSR) from about 850-1700 nm.

2. The imaging filter of claim 1 wherein said set of birefringent retarders comprises at least one of: an active retarder, a passive retarder, and combinations thereof.

3. The imaging filter of claim 2 wherein said active retarder comprises a liquid crystal birefringence element.

4. The imaging filter of claim 2 wherein said passive retarder comprises a fixed retarder.

5. The imaging filter of claim 1 wherein at least one of said at least two filter stages is tunable to said operative state wherein the bandpass peaks of said at least two filter stages overlap.

6. The spectral imaging filter of claim 1 wherein a plurality of said at least two filter stages is tunable to said operative state and wherein the bandpass peaks of said plurality of filter stages overlap.

7. The spectral imaging filter of claim 1, wherein the at least two filter stages comprise filter configurations comprising a set of birefringent retarders disposed between and distributed in rotational alignment between two polarizers, wherein
the birefringent retarders within each of the stages providing equal retardation with others of the retarders in the same one of the stages, and
wherein the birefringent retarders comprise at least one of an active retarder, a passive retarder, and combinations thereof.

8. The spectral imaging filter of claim 4, wherein the retarders in different ones of the stages produce said retardation that is different from the retardation of the birefringent retarders in at least one other of the stages because the birefringent retarders in said one of the stages and said other of the stages have distinctly different thicknesses.

9. The spectral imaging filter of claim 4, wherein the retarders in said stages provide said different retardation by one of a difference in materials, a difference in thickness along the optical signal path, and a tunable difference.

10. The spectral imaging filter of claim 7 wherein at least one of the filter stages comprise a plurality of active retarders.

11. The spectral imaging filter of claim 10 wherein said active retarders comprise liquid crystal birefrigence elements.

12. The spectral imaging filter of claim 7 wherein at least one of the filter stages comprise at least one passive retarder coupled to at least one active retarder.

13. The spectral imaging filter of claim 12 wherein said at least one passive retarder comprises a fixed retarder and said at least one active retarder comprises a liquid crystal birefringence element.

14. The spectral imaging filter of claim 13 wherein said liquid crystal birefringence elements comprise at least one pair of liquid crystal birefringence elements rotationally orientated so as to effectively compensate for retardation.

15. The spectral imaging filter of claim 12 wherein said passive retarders are index matched to at least one portion of said active retarder.

16. The spectral imaging filter of claim 4 wherein said fixed retarder comprises a material selected from the group consisting of: quartz, $\alpha$-BBO, and combinations thereof.

17. The spectral imaging filter of claim 7 wherein a number of said stages, and a number and respective thickness of retarders within the stages, are chosen to provide a full width half maximum bandpass peak width (FWHM) of about 5-25 nm.

18. The spectral imaging filter of claim 17 wherein a number of said spectral filter stages is limited such that a transmission ratio of a selected wavelength through the spectral filter is at least about 25-50%.

19. The spectral imaging filter of claim 7, comprising six filter stages, wherein
one of said filter stages comprises a polarizer and at least one active retarder; and
five of said filter stages comprise at least one of: a polarizer, an active retarder, and a passive retarder, and combinations thereof.

20. The spectral imaging filter of claim 7 wherein the active retarders in at least one of the stages comprise a plurality of liquid crystal birefringence elements coupled to a common tuning control for varying a birefringence equally for the retarders in said one of the stages.

21. The spectral imaging filter of claim 7 wherein the active retarders in at least two of the stages comprise a plurality of liquid crystal birefringence elements coupled to a tuning control that for independently varying the birefringence for the retarders in respective ones of the at least two stages.

22. The spectral imaging filter of claim 20, wherein at least some of the stages comprise tunable retarders having a plurality of abutting rotationally aligned liquid crystal birefringence elements that are tunable in unison.

23. The spectral imaging filter of claim 1, comprising at least six said spectral filter stages coupled along the optical signal path, each of the stages leading into an output polarizer, whereby the output polarizer for leading stages functions as an input polarizer for following stages and a number of said polarizers is limited to a number of stages plus one.

* * * * *